(12) United States Patent
Mase et al.

(10) Patent No.: US 9,494,688 B2
(45) Date of Patent: Nov. 15, 2016

(54) RANGE SENSOR AND RANGE IMAGE SENSOR

(75) Inventors: Mitsuhito Mase, Hamamatsu (JP); Takashi Suzuki, Hamamatsu (JP)

(73) Assignee: HAMAMATSU PHOTONICS K.K., Hamamatsu-shi, Shizuoka (JP)

(*) Notice: Subject to any disclaimer, the term of this patent is extended or adjusted under 35 U.S.C. 154(b) by 603 days.

(21) Appl. No.: 13/810,519

(22) PCT Filed: Jun. 16, 2011

(86) PCT No.: PCT/JP2011/063845
§ 371 (c)(1),
(2), (4) Date: Jan. 16, 2013

(87) PCT Pub. No.: WO2012/049885
PCT Pub. Date: Apr. 19, 2012

(65) Prior Publication Data
US 2013/0120735 A1    May 16, 2013

(30) Foreign Application Priority Data

Oct. 12, 2010    (JP) ................................ 2010-229781

(51) Int. Cl.
*G01C 3/08*       (2006.01)
*G01S 17/89*     (2006.01)
*G01S 7/486*     (2006.01)

(52) U.S. Cl.
CPC .............. *G01S 17/89* (2013.01); *G01S 7/4863* (2013.01)

(58) Field of Classification Search
CPC ............................. G01S 17/89; G01S 7/4863
See application file for complete search history.

(56) References Cited

U.S. PATENT DOCUMENTS

| 5,990,953 | A   | * | 11/1999 | Nakashiba ................. 348/314 |
| 2009/0230437 | A1 | * | 9/2009 | Kawahito et al. ........... 257/226 |
| 2013/0221472 | A1 |   | 8/2013 | Mase et al. |

FOREIGN PATENT DOCUMENTS

| JP | 2008-89346   | 4/2008  |
| JP | 2009-8537    | 1/2009  |
| JP | 2009-47661   | 3/2009  |
| WO | 2007/119626  | 10/2007 |
| WO | 2008/069141  | 6/2008  |

OTHER PUBLICATIONS

U.S. Office Action dated Sep. 12, 2013 that issued in U.S. Appl. No. 13/644,605 including Double Patenting Rejections on pp. 2-3.

* cited by examiner

*Primary Examiner* — Luke Ratcliffe
*Assistant Examiner* — Samantha K Abraham
(74) *Attorney, Agent, or Firm* — Drinker Biddle & Reath LLP

(57) ABSTRACT

A light receiving region has a planar shape of a rectangular shape having a pair of long sides opposed to each other in a first direction and a pair of short sides opposed to each other in a second direction. First and second semiconductor regions are arranged as spatially separated from each other along the respective long sides. First and second gate electrodes are arranged each between the corresponding semiconductor region and the light receiving region. Third gate electrodes are arranged as spatially separated from each other between the first and second gate electrodes arranged along the long sides. Each of the third gate electrodes has a first electrode portion located between a third semiconductor region and the light receiving region, and a second electrode portion overlapping with the light receiving region and having a width in the second direction smaller than that of the first electrode portion.

8 Claims, 23 Drawing Sheets

Fig.8
(a)
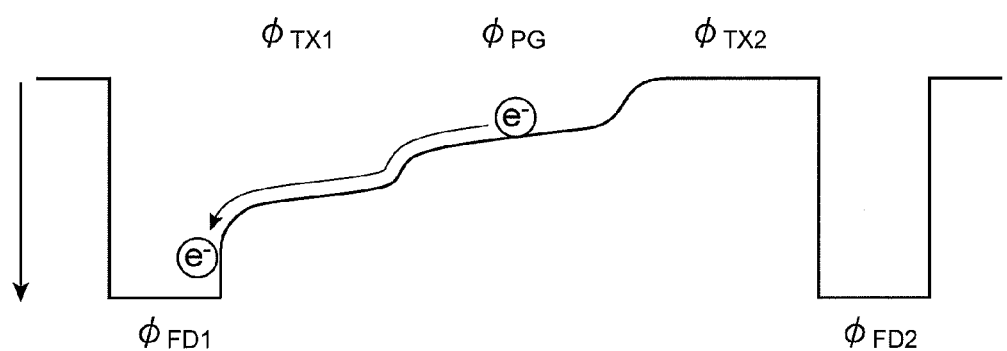
(b)
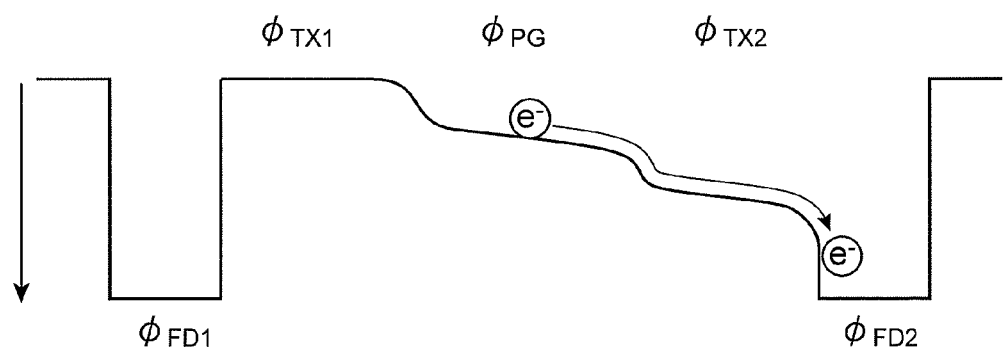

Fig.9
(a)
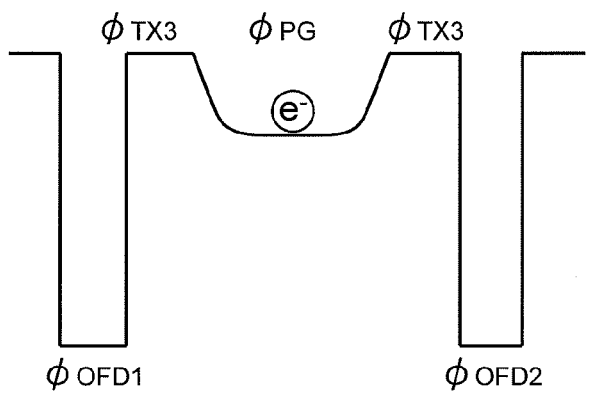
(b)
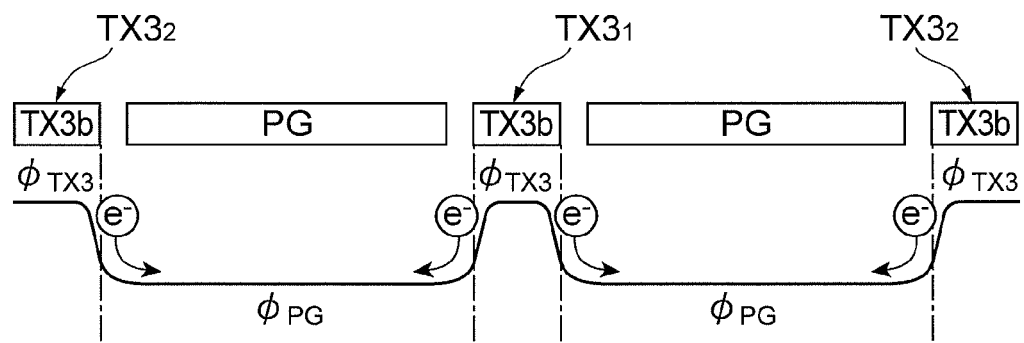

Fig.10
(a)
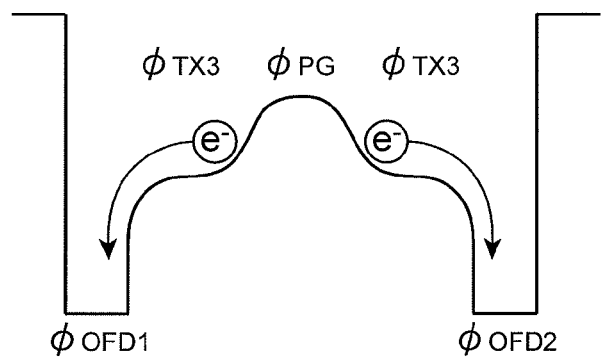
(b)
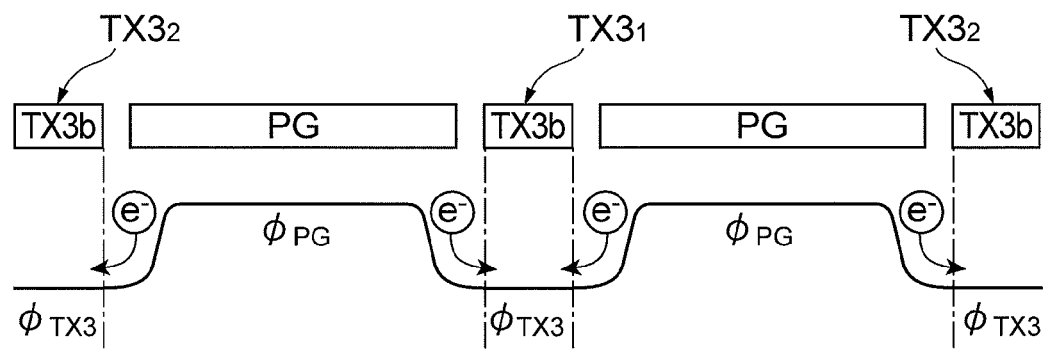

RANGE SENSOR AND RANGE IMAGE SENSOR

TECHNICAL FIELD

The present invention relates to a range sensor and a range image sensor.

BACKGROUND ART

A conventional active type optical distance measuring sensor is known as a device configured to irradiate light from a light source for projection of light such as an LED (Light Emitting Diode) toward an object, to detect reflected light from the object with a photodetecting element, and thereby to output a signal according to the distance to the object. A PSD (Position Sensitive Detector) is known as an optical distance measuring sensor of the optical triangulation type capable of readily measuring the distance to the object. Recently, there are expectations for development of an optical distance measuring sensor of an optical TOF (Time-Of-Flight) type, in order to achieve more accurate distance measurement.

There are demands for an image sensor capable of simultaneously acquiring distance information and image information by a single chip, for example, in on-vehicle use, in use in automatic manufacture systems in factories, and so on. As the image sensor is installed in the front portion of a vehicle, it is expected to be used in detection and recognition of a preceding vehicle or in detection and recognition of a pedestrian or the like. There are also expectations for an image sensor capable of acquiring a range image consisting of a single piece of distance information or multiple pieces of distance information, separately from the image information. It is preferable to apply the TOF method to such a distance measuring sensor.

In the TOF method, pulsed light is emitted from a light source for projection of light toward an object and the pulsed light reflected by the object is detected by the photodetecting element to measure a time difference between the emission timing and the detection timing of the pulsed light. Since this time difference ($\Delta t$) is a time necessary for the pulsed light to travel a distance ($2 \times d$) which is twice the distance d to the object, at the speed of light ($=c$), the relation of $d=(c \times \Delta t)/2$ holds. The time difference ($\Delta t$) can be translated into a phase difference between pulses emitted from the light source and detected pulses. The distance d to the object can be determined by detecting the phase difference.

An image sensor of a charge distribution type has been attracting attention as a photodetecting element for distance measurement by the TOF method. Specifically, the image sensor of the charge distribution type is configured, for example, to distribute pulsed charges generated in the image sensor according to incidence of detected pulses, into one potential well during ON durations of emitted pulses and into the other potential well during OFF durations thereof. In this case, a ratio of charge quantities distributed right and left is proportional to the phase difference between detected pulses and emitted pulses, i.e., the time necessary for the pulsed light to travel the distance twice as long as the distance to the object at the speed of light. There are various conceivable methods of the charge distribution type.

Patent Literature 1 discloses the range sensor (range image sensor) of the TOF type which comprises a light receiving region, a pair of signal charge collecting regions arranged as spatially separated from each other and configured to collect the signal charge generated according to incident light, and transfer electrodes provided for the respective signal charge collecting regions and given respective charge transfer signals of different phases.

CITATION LIST

Patent Literature

Patent Literature 1: International Publication WO2007/119626

SUMMARY OF INVENTION

Technical Problem

Incidentally, a rectangular shape having a pair of long sides opposed to each other in a first direction and a pair of short sides opposed to each other in a second direction is sometimes adopted as a planar shape of the light receiving region. In this case, the signal charge collecting regions are arranged opposite to each other with the light receiving region in between in the first direction. The reasons for the adoption of the rectangular shape are, for example, to enhance the sensitivity with increase in the area of the light receiving region and to increase a transfer rate of charge in the direction in which the signal charge collecting regions are opposed.

However, it was newly found that the problem as described below could arise in the case where the planar shape of the light receiving region was the aforementioned rectangular shape and where the signal charge collecting regions were arranged opposite to each other with the light receiving region in between in the first direction.

In the first direction, the charge generated according to incident light can be transferred as signal charge at high speed because an electric field established by the transfer electrodes and the signal charge collecting regions acts on the charge. However, the electric field by the transfer electrodes and the signal charge collecting regions is less likely to act fully in the second direction. Particularly, it is difficult to quickly transfer the charge generated near the short sides of the light receiving region.

By extending each of the signal charge collecting regions and the transfer electrodes in the second direction, it is possible to quickly transfer the charge generated near the short sides of the light receiving region. However, if the area of the signal charge collecting regions is increased by the extension of the signal charge collecting regions in the second direction, the sensitivity of the range sensor will degrade for the following reason. The charge (Q) transferred into each signal charge collecting region causes a voltage change ($\Delta V$) represented by a relational expression below, because of the capacitance (Cfd) of the signal charge collecting region.

$$\Delta V = Q/Cfd$$

The increase in the area of the signal charge collecting region leads to an increase in the capacitance of the signal charge collecting region as well, so as to decrease the voltage change caused. Namely, it decreases a charge-voltage conversion gain. For this reason, the sensitivity of the range sensor becomes degraded.

In order to achieve the enhancement of the sensitivity of the range sensor, as described above, the area of the signal charge collecting regions has to be kept small and the length of the signal charge collecting regions in the second direction needs to be set smaller than the length of the long sides of the light receiving region. For this reason, even with extension of the transfer electrodes in the second direction, it is difficult to transfer the charge in the second direction in the regions immediately below the transfer electrodes, and thus the problem of low transfer rate of charge still remains unsolved.

It is an object of the present invention to provide a range sensor and a range image sensor capable of achieving the high-speed transfer of charge, while enhancing the sensitivity.

Solution to Problem

A range sensor according to the present invention is a range sensor comprising: a light receiving region a planar shape of which is a rectangular shape having a pair of long sides opposed to each other in a first direction and a pair of short sides opposed to each other in a second direction; a plurality of signal charge collecting regions arranged as opposed to each other with the light receiving region in between in the first direction and as spatially separated from each other in the second direction, for collecting signal charge generated according to incident light; transfer electrodes each of which is arranged between the signal charge collecting region and the light receiving region and to which respective charge transfer signals of different phases are supplied; unnecessary charge collecting regions for collecting unnecessary charge generated; and unnecessary charge collecting gate electrodes arranged beside each of the long sides, as spatially separated from each other between the transfer electrodes arranged along the long side, for selectively performing blocking and opening of a flow of unnecessary charge into the unnecessary charge collecting regions, wherein each of the unnecessary charge collecting gate electrodes has a first electrode portion located between the unnecessary charge collecting region and the light receiving region, and a second electrode portion overlapping with the light receiving region and having a width in the second direction smaller than that of the first electrode portion.

In the range sensor according to the present invention, potentials of regions immediately below the unnecessary charge collecting gate electrodes (second electrode portions) are raised in an operation of transferring the charge generated according to incident light, to the signal charge collecting regions, in order to prevent the charge from being transferred as unnecessary charge to the unnecessary charge collecting regions. For this reason, the charge generated near the regions immediately below the unnecessary charge collecting gate electrodes (second electrode portions) becomes easier to migrate toward regions located between the signal charge collecting regions opposed to each other in the first direction in the light receiving region, because of a potential difference. The charge having migrated toward the regions located between the signal charge collecting regions is quickly transferred by an electric field established by the transfer electrodes and the signal charge collecting regions. Therefore, the charge generated according to the incident light can be quickly transferred as signal charge, even in the case where the area is increased by setting the length in the direction (second direction) perpendicular to the direction in which the signal charge collecting regions are opposed, longer than the length in the direction (first direction) in which they are opposed, i.e., where the planar shape of the light receiving region is the rectangular shape, and in the case where the sensitivity is enhanced by setting the area of the signal charge collecting regions small.

In the present invention, the width of the second electrode portion in the second direction is smaller than that of the first electrode portion. In this case, the area of the region immediately below the second electrode portion becomes relatively small and a quantity of charge hard to migrate as staying in the region immediately below the second electrode portion becomes extremely small. As a consequence, it is feasible to prevent the second electrode portion of the unnecessary charge collecting gate electrode from impeding the enhancement of sensitivity. A quantity of unnecessary charge hard to migrate as staying in the region immediately below the second electrode portion is also extremely small. Therefore, the unnecessary charge is appropriately discharged, without impeding improvement in accuracy of distance measurement.

The second electrode portion may have the width in the second direction decreasing with distance from the first electrode portion. In this case, the area of the region immediately below the second electrode portion becomes much smaller, so as to further reduce the quantity of charge hard to migrate as staying in the region immediately below the second electrode portion. As a consequence, it becomes feasible to further prevent the second electrode portion of the unnecessary charge collecting gate electrode from impeding the enhancement of sensitivity and the improvement in accuracy of distance measurement.

The second electrode portions opposed to each other in the first direction may be continuous with each other. In this case, the charge generated near the regions immediately below the unnecessary charge collecting gate electrodes (second electrode portions) and in the central region in the first direction in the light receiving region becomes easier to migrate to the regions located between the signal charge collecting regions. This can achieve further enhancement of sensitivity. The quantity of charge remaining in a region immediately below the continuous portion becomes small, particularly, in the case where the width in the second direction of the continuous portion of each second electrode portion decreases with distance from the corresponding first electrode portion. As a consequence, it is feasible to prevent the remaining charge from impeding the enhancement of sensitivity and the improvement in accuracy of distance measurement.

The range sensor may further comprise: potential adjusting means arranged opposite to each other with the light receiving region in between in the second direction, for making a potential near each of the short sides of the light receiving region, higher than a potential in regions located between the signal charge collecting regions opposed to each other in the first direction, in the light receiving region.

In this case, the potential adjusting means make the potential near each of the short sides of the light receiving region higher than the potential in the regions located between the signal charge collecting regions opposed to each other in the first direction in the light receiving region. For this reason, the charge generated near each short side of the light receiving region becomes easier to migrate in the second direction toward the regions located between the signal charge collecting regions because of a potential difference. The charge having migrated in the second direction toward the regions located between the signal charge collecting regions is quickly transferred by an electric field established by the transfer electrodes and the signal charge collecting regions. Therefore, the charge generated according to the incident light can be transferred more quickly as signal charge, even in the case where the enhancement of sensitivity is achieved as described above.

The potential adjusting means may be semiconductor regions having the same conductivity type as the light receiving region and a higher impurity concentration than the light receiving region. In this case, since the impurity concentration of the semiconductor regions arranged opposite to each other with the light receiving region in between in the second direction is higher than that in the light receiving region, the potential difference is large. Since the semiconductor regions can be formed by adjustment of the impurity concentration, the potential adjusting means can be readily substantialized.

The range sensor may further comprise a photogate electrode arranged above the light receiving region and the potential adjusting means may be electrodes given an electrical potential lower than an electrical potential given to the photogate electrode. In this case, since the electrical potential given to the electrodes arranged opposite to each other with the light receiving region in between in the second direction is lower than the electrical potential given to the photogate electrode, the potential difference is large. The potential adjusting means can be readily substantialized by the simple configuration such as the electrodes.

The unnecessary charge collecting gate electrodes may be given an electrical potential such that a potential in regions immediately below the second electrode portions is higher than a potential in regions located between the signal charge collecting regions opposed to each other in the first direction, during the blocking of the flow of unnecessary charge into the unnecessary charge collecting regions. In this case, the potential in the regions immediately below the second electrode portions can be stably maintained.

A range image sensor according to the present invention is a range image sensor comprising: an imaging region consisting of a plurality of units arranged in a one-dimensional pattern or in a two-dimensional pattern, on a semiconductor substrate, and configured to obtain a range image, based on charge quantities output from the units, wherein one unit is the aforementioned range sensor. In the present invention, as described above, the charge generated according to the incident light can be quickly transferred as signal charge, even in the case where the planar shape of the light receiving region is the rectangular shape and in the case where the enhancement of sensitivity is achieved by setting the area of the signal charge collecting regions small.

Advantageous Effect of Invention

The present invention provides the range sensor and the range image sensor capable of achieving the quick transfer of charge, while achieving the enhancement of sensitivity.

BRIEF DESCRIPTION OF DRAWINGS

FIG. 8 is a drawing showing potential profiles, for explaining an accumulation operation of signal charge.

FIG. 9 is a drawing showing potential profiles, for explaining the accumulation operation of signal charge.

FIG. 10 is a drawing showing potential profiles, for explaining a discharge operation of unnecessary charge.

DESCRIPTION OF EMBODIMENTS

The preferred embodiments of the present invention will be described below in detail with reference to the accompanying drawings. In the description, the same elements or elements with the same functionality will be denoted by the same reference signs, without redundant description.

Figure 1:
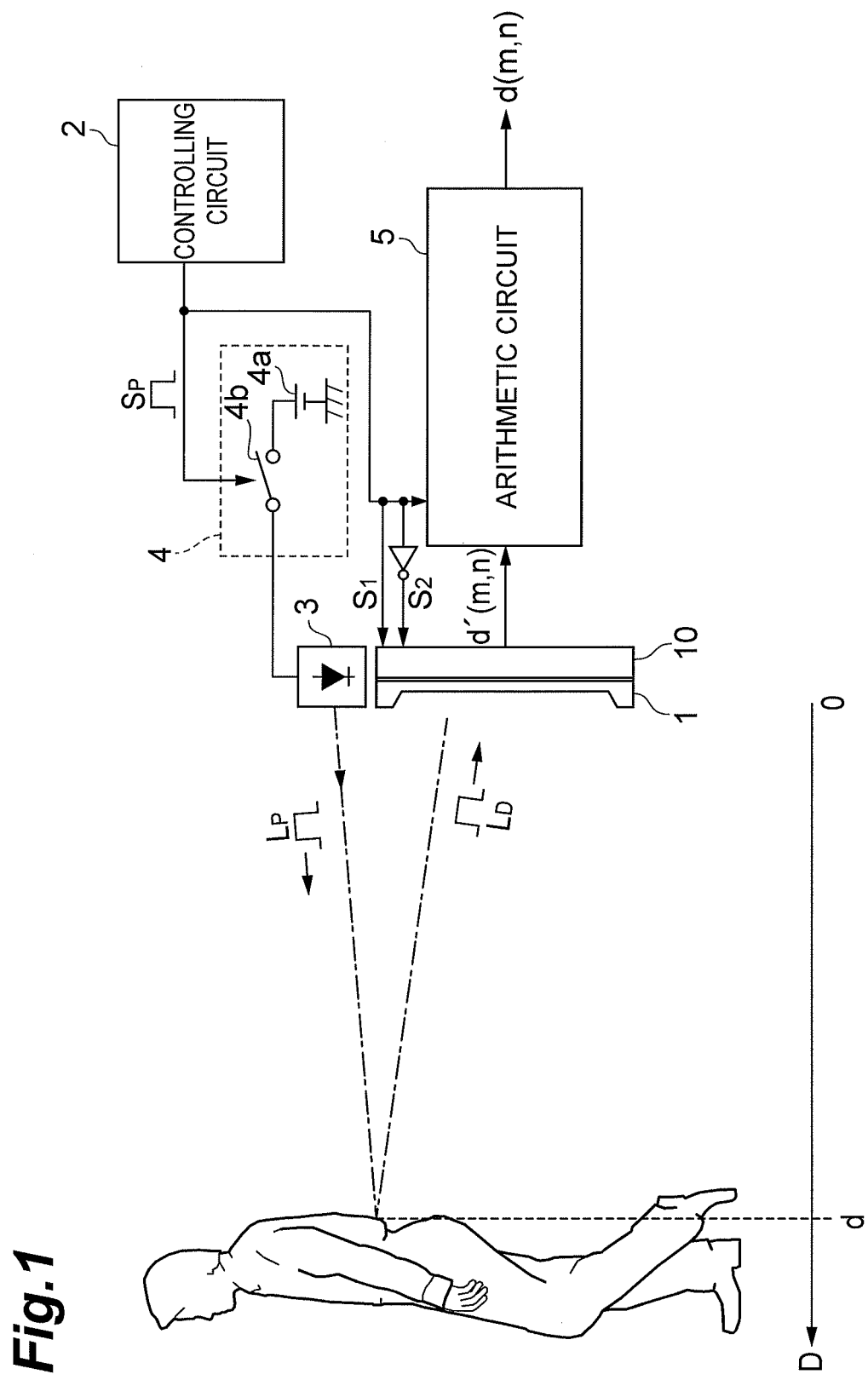
FIG. 1 is an explanatory drawing showing a configuration of a distance measuring device according to an embodiment of the present invention.

FIG. 1 is an explanatory drawing showing a configuration of a distance measuring device.

This distance measuring device is provided with a range image sensor 1, a light source 3 to emit near-infrared light, a driving circuit 4 to supply a pulse drive signal $S_P$ to the light source 3, a controlling circuit 2, and an arithmetic circuit 5. The controlling circuit 2 supplies detection gate signals $S_1$, $S_2$ in synchronism with the pulse drive signal $S_P$ to first and second gate electrodes (TX1, TX2: cf. FIG. 4) in each pixel of the range image sensor 1. The arithmetic circuit 5 calculates a distance to an object H such as a pedestrian, from signals d'(m, n) indicative of distance information read out from first and second semiconductor regions (FD1-FD2: cf. FIG. 4) of the range image sensor 1. The distance in the horizontal direction D from the range image sensor 1 to the object H is represented by d.

The controlling circuit 2 feeds the pulse drive signal $S_P$ to a switch 4b of the driving circuit 4. The light source 3 for projection of light consisting of an LED or a laser diode is connected via the switch 4b to a power supply 4a. Therefore, when the pulse drive signal $S_P$ is supplied to the switch 4b, a drive current of the same waveform as the pulse drive signal $S_P$ is supplied to the light source 3 and the light source 3 outputs pulsed light $L_P$ as probe light for distance measurement.

When the pulsed light $L_P$ is irradiated on the object H, the object H reflects the pulsed light. Then the reflected light is incident as pulsed light $L_D$ into the range image sensor 1 and the range image sensor 1 outputs a pulse detection signal $S_D$.

The range image sensor 1 is fixed on a wiring board 10. In the range image sensor 1, signals d'(m, n) having distance information are output from each pixel through wiring on the wiring board 10.

Supposing the waveform of the pulse drive signal $S_P$ is a rectangular wave with the period T and its high level is represented by "1" and low level by "0," the voltage V(t) thereof is given by the following formulae.
Pulse drive signal $S_P$:

$V(t)=1$ (in the case of $0<t<(T/2)$);

$V(t)=0$ (in the case of $(T/2)<t<T$);

$V(t+T)=V(t)$.

The waveforms of the detection gate signals $S_1$, $S_2$ are rectangular waves with the period T and the voltage V(t) thereof is given by the following formulae.
Detection gate signal $S_1$:

$V(t)=1$ (in the case of $0<t<(T/2)$);

$V(t)=0$ (in the case of $(T/2)<t<T$);

$V(t+T)=V(t)$.

Detection gate signal $S_2$ (=inversion of $S_1$):

$V(t)=0$ (in the case of $0<t<(T/2)$);

$V(t)=1$ (in the case of $(T/2)<t<T$);

$V(t+T)=V(t)$.

The foregoing pulse signals $S_P$, $S_1$, $S_2$, $S_D$ all have the pulse period $2\times T_P$. Let us define Q1 as a charge quantity generated in the range image sensor 1 when both the detection gate signal $S_1$ and the pulse detection signal $S_D$ are "1." Q2 is defined as a charge quantity generated in the range image sensor 1 when both the detection gate signal $S_2$ and the pulse detection signal $S_D$ are "1."

A phase difference between one detection gate signal $S_1$ and the pulse detection signal $S_D$ in the range image sensor 1 is proportional to the charge quantity Q2 generated in the range image sensor 1, in an overlap duration in which the other detection gate signal $S_2$ and the pulse detection signal $S_D$ are "1." Namely, the charge quantity Q2 is a charge quantity generated in the duration in which AND of the detection gate signal $S_2$ and the pulse detection signal $S_D$ is "1." When a total charge quantity generated in one pixel is Q1+Q2 and the pulse width of a half period of the drive signal $S_P$ is $T_P$, the pulse detection signal $S_D$ lags behind the drive signal $S_P$ by a time of $\Delta t = T_P \times Q2/(Q1+Q2)$. The time of flight $\Delta t$ of one light pulse is given by $\Delta t = 2d/c$, where d is the distance to the object and c the speed of light. Therefore, when two charge quantities (Q1, Q2) are output as signals d'(m, n) having the distance information from a specific pixel, the arithmetic circuit 5 calculates the distance $d=(c\times\Delta t)/2=c\times T_P\times Q2/(2\times(Q1+Q2))$ to the object H, based on the input charge quantities Q1, Q2 and the known half-period pulse width $T_P$.

As described above, the arithmetic circuit 5 can calculate the distance d by separately reading out the charge quantities Q1, Q2. The foregoing pulses are repeatedly emitted and integral values thereof can be output as respective charge quantities Q1, Q2.

The ratio to the total charge quantity of the charge quantities Q1, Q2 corresponds to the aforementioned phase difference, i.e., to the distance to the object H. The arithmetic circuit 5 calculates the distance to the object H according to this phase difference. As described above, when the time difference corresponding to the phase difference is represented by $\Delta t$, the distance d is preferably given by $d=(c\times\Delta t)/2$, but an appropriate correction operation may be performed in addition thereto. For example, if an actual distance is different from the calculated distance d, a factor $\beta$ to correct the latter is preliminarily obtained and the finally calculated distance d can be determined by multiplying the calculated distance d by the factor $\beta$ in a product after shipped. Another available correction is such that the ambient temperature is measured, an operation to correct the speed of light c is performed if the speed of light c differs depending upon the ambient temperature, and then the distance calculation is performed. The distance may also be determined by a lookup table method, while preliminarily storing a relation between signals input into the arithmetic circuit and actual distances in a memory. The calculation method can be modified depending upon the sensor structure and the conventionally known calculation methods can be applied thereto.

Figure 2:
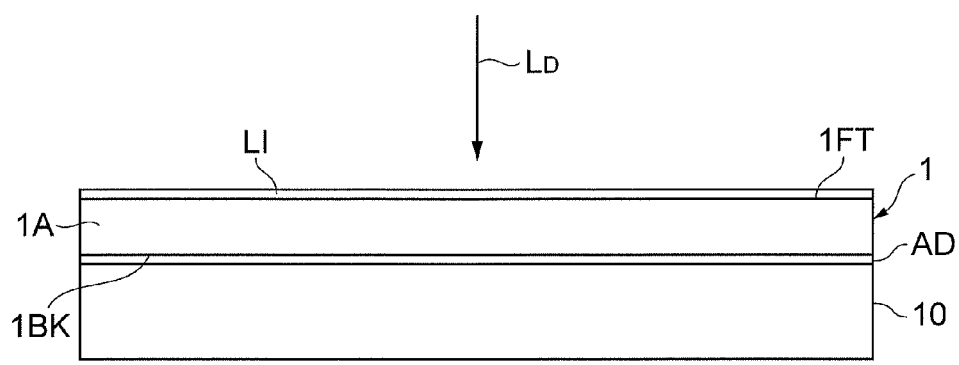
FIG. 2 is a drawing for explaining a cross-sectional configuration of a range image sensor.

FIG. 2 is a drawing for explaining a cross-sectional configuration of the range image sensor.

The range image sensor 1 is a range image sensor of a front illuminated type and is provided with a semiconductor substrate 1A. The pulsed light $L_D$ is incident through a light incident surface 1FT of the semiconductor substrate 1A into the range image sensor 1. A back surface 1BK opposite to the light incident surface 1FT of the range image sensor 1 is connected through an adhesive region AD to the wiring board 10. The adhesive region AD has an insulating adhesive and filler. The range image sensor 1 is provided with a light shielding layer LI having an aperture at a predetermined position. The light shielding layer LI is arranged in front of the light incident surface 1FT.

Figure 3:
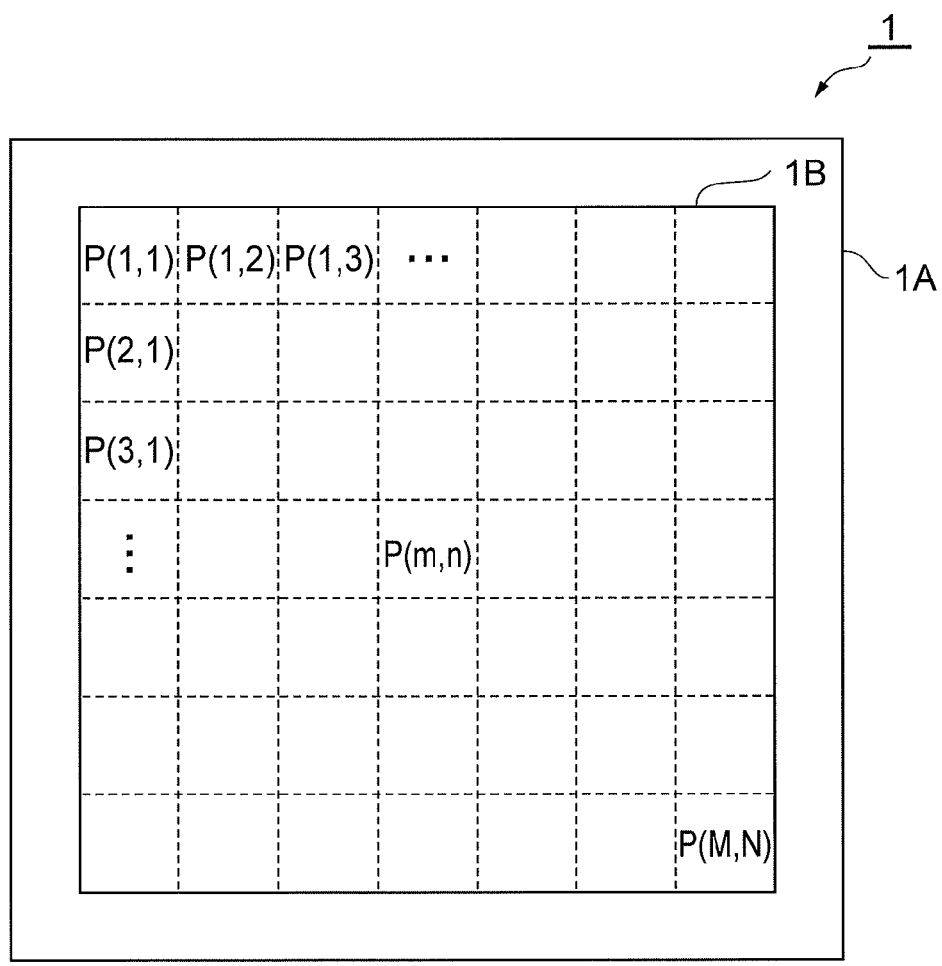
FIG. 3 is a schematic plan view of the range image sensor.

FIG. 3 is a schematic plan view of the range image sensor.

In the range image sensor 1, the semiconductor substrate 1A has an imaging region 1B consisting of a plurality of pixels P(m, n) arrayed in a two-dimensional pattern. Each pixel P(m, n) outputs two charge quantities (Q1, Q2) as the aforementioned signals d'(m, n) having the distance information. Each pixel P(m, n) functions as a microscopic distance measuring sensor to output the signals d'(m, n) according to the distance to the object H. Therefore, when the reflected light from the object H is focused on the imaging region 1B, the sensor is able to obtain a range image of the object as a collection of distance information to respective points on the object H. One pixel P(m, n) functions as a range sensor.

Figure 4:
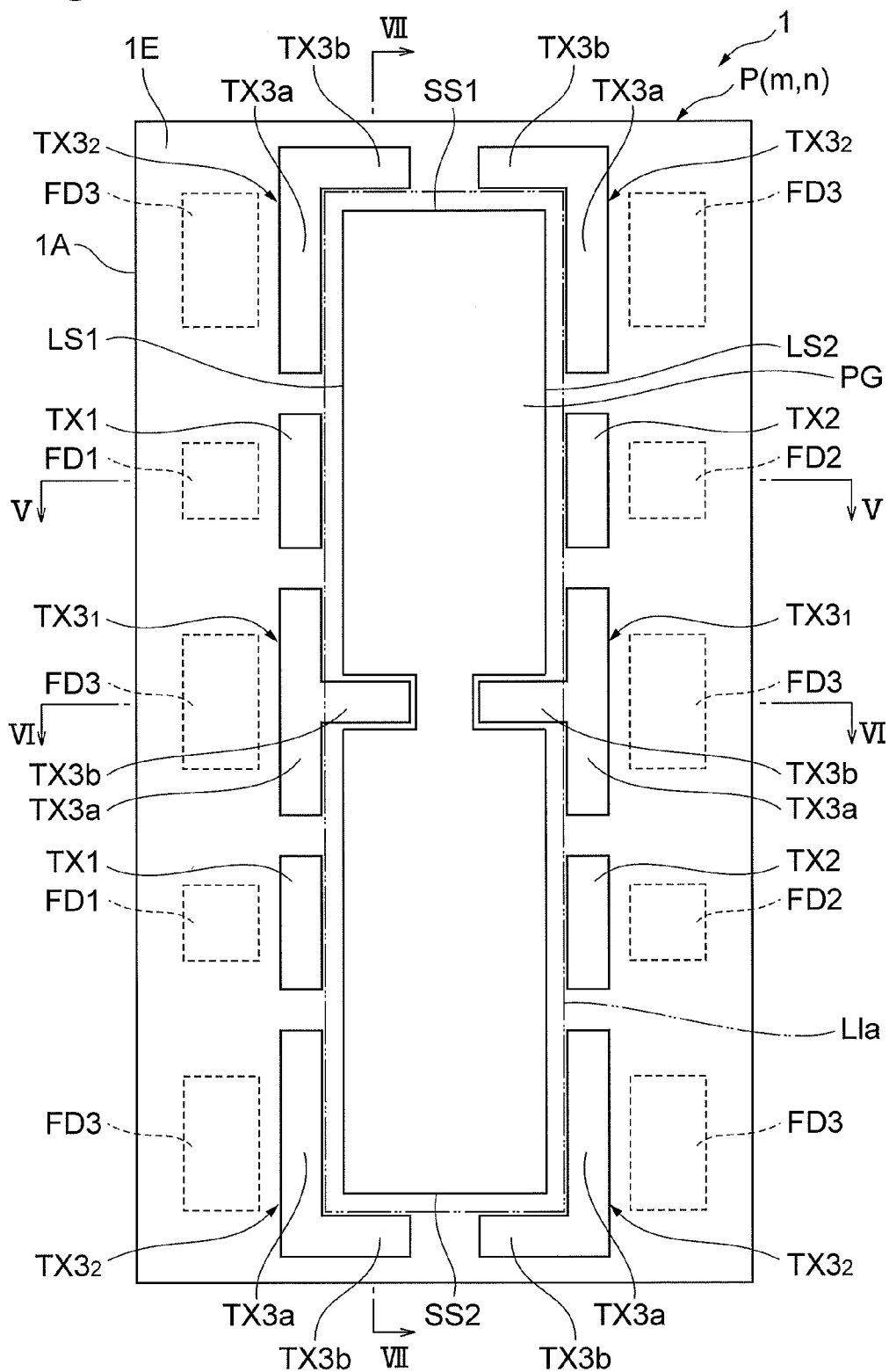
FIG. 4 is a schematic drawing for explaining a configuration of a pixel in the range image sensor.
Figure 5:
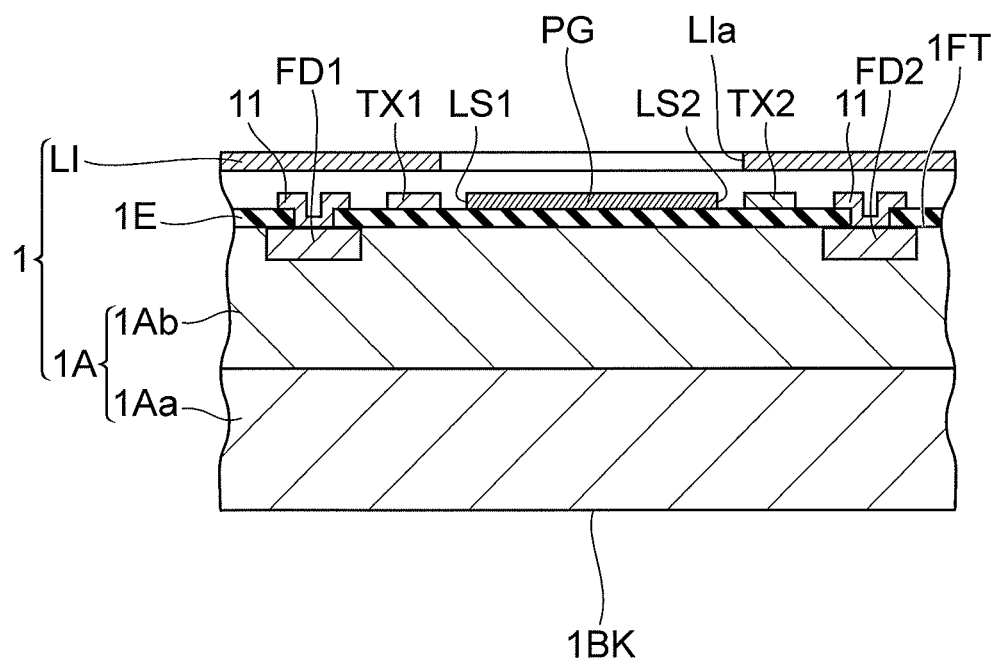
FIG. 5 is a drawing showing a cross-sectional configuration along the line V-V in FIG. 4.
Figure 6:
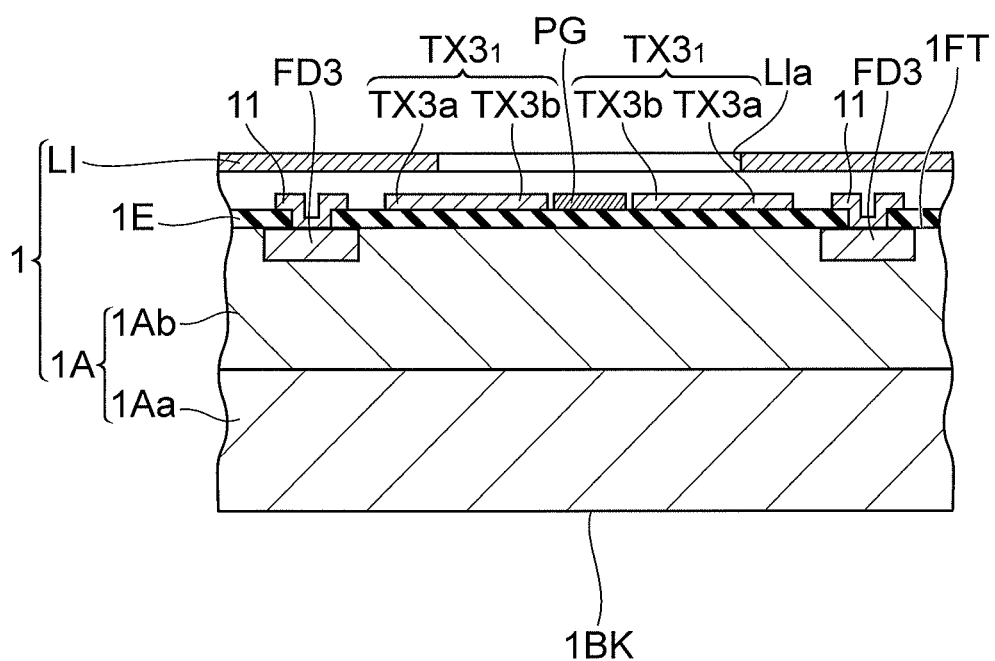
FIG. 6 is a drawing showing a cross-sectional configuration along the line VI-VI in FIG. 4.
Figure 7:
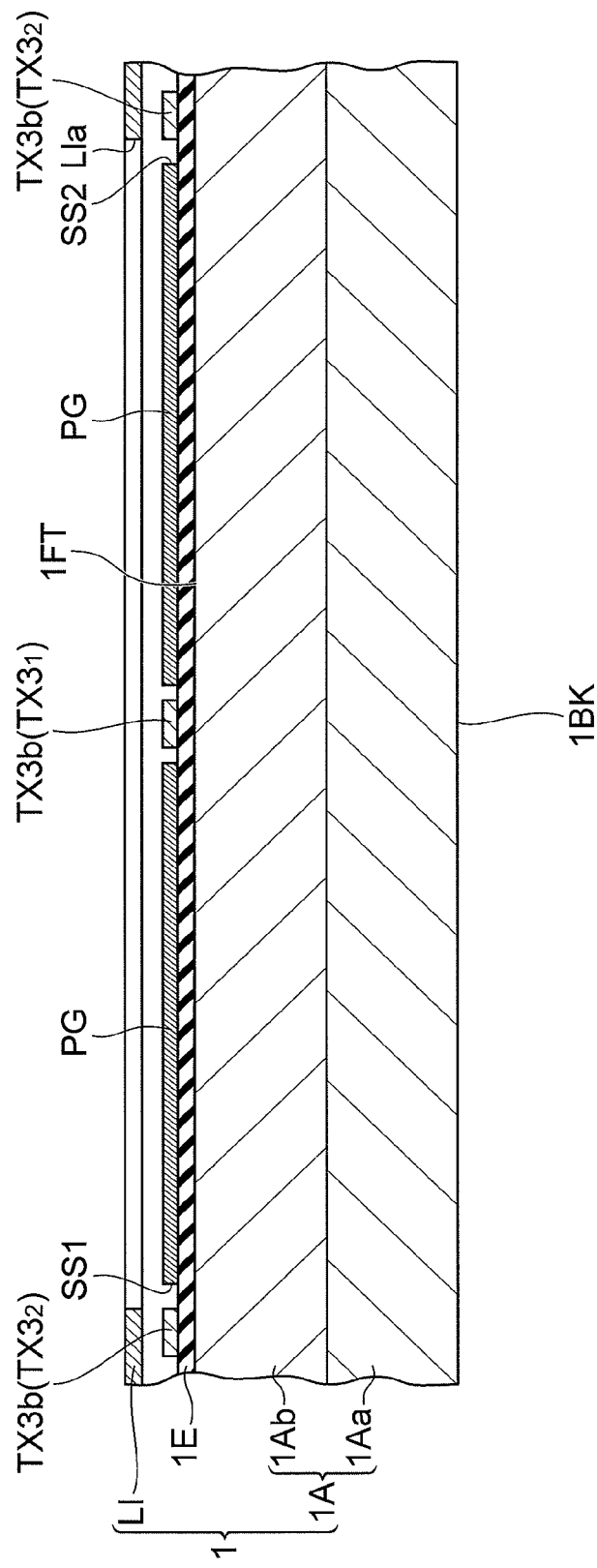
FIG. 7 is a drawing showing a cross-sectional configuration along the line VII-VII in FIG. 4.

FIG. 4 is a schematic view for explaining a configuration of a pixel in the range image sensor. FIG. 5 is a drawing showing a cross-sectional configuration along the line V-V in FIG. 4. FIG. 6 is a drawing showing a cross-sectional configuration along the line VI-VI in FIG. 4. FIG. 7 is a drawing showing a cross-sectional configuration along the line VII-VII in FIG. 4. In FIG. 4, illustration of conductors 11 is omitted.

The range image sensor 1 is provided with the semiconductor substrate 1A having the light incident surface 1FT and the back surface 1BK opposed to each other. The semiconductor substrate 1A consists of a p-type first substrate region 1Aa located on the back surface 1BK side, and a p-type second substrate region 1Ab having a lower impurity concentration than the first substrate region 1Aa and located on the light incident surface 1FT side. The semiconductor substrate 1A can be obtained, for example, by growing on a p-type semiconductor substrate, a p-type epitaxial layer with a lower impurity concentration than the semiconductor substrate.

The range image sensor 1 has, in each pixel P(m,n), a photogate electrode PG, a plurality of first gate electrodes TX1 and second gate electrodes TX2 (two each in the present embodiment), a plurality of third gate electrodes $TX3_1$, $TX3_2$ (six in the present embodiment), a plurality of first semiconductor regions FD1 and second semiconductor regions FD2 (two each in the present embodiment), and a plurality of third semiconductor regions FD3 (six in the present embodiment). The photogate electrode PG is provided through an insulating layer 1E on the light incident surface 1FT. The first to third gate electrodes TX1, TX2, $TX3_1$, $TX3_2$ are provided adjacent to the photogate electrode PG through the insulating layer 1E on the light incident surface 1FT. The first and second semiconductor regions FD1, FD2 accumulate respective charges flowing into regions immediately below the corresponding gate electrodes TX1, TX2. In the present example the semiconductor substrate 1A is comprised of Si and the insulating layer 1E of $SiO_2$.

The light shielding layer LI has the rectangular aperture LIa formed therein. Light (reflected light from the object H) passes through the aperture LIa of the light shielding layer LI into the semiconductor substrate 1A. Therefore, the aperture LIa defines a light receiving region a planar shape of which is a rectangular shape having a pair of long sides opposed to each other and a pair of short sides opposed to each other, over the semiconductor substrate 1A. The light shielding layer LI is comprised, for example, of a metal such as aluminum.

The photogate electrode PG is arranged corresponding to the aperture LIa. The photogate electrode PG has a planar shape of a nearly rectangular shape having first and second long sides LS1, LS2 opposed to each other and first and second short sides SS1, SS2 opposed to each other. In the present embodiment, a value of a ratio of the length of the first and second short sides SS1, SS2 to the length of the first and second long sides LS1, LS2 is set, for example, to about 1:2 to 1:15. The photogate electrode PG is comprised of polysilicon but may be comprised of another material.

The first and second long sides LS1, LS2 of the photogate electrode PG are parallel to each of the long sides of the aforementioned light receiving region. Therefore, a direction in which the first and second long sides LS1, LS2 are opposed agrees with a direction in which the long sides of the light receiving region are opposed. The first and second short sides SS1, SS2 of the photogate electrode PG are parallel to each of the short sides of the light receiving region. Therefore, a direction in which the first and second short sides SS1, SS2 are opposed agrees with a direction in which the short sides of the light receiving region are opposed.

The first semiconductor regions FD1 are arranged as spatially separated from each other along the first long side LS1, on the side where the first long side LS1 of the photogate electrode PG exists. The first semiconductor regions FD1 are also arranged as spatially separated from the region immediately below the photogate electrode PG. Namely, the first semiconductor regions FD1 are arranged as spatially separated from the light receiving region, on the side where one long side of the light receiving region exists.

The second semiconductor regions FD2 are arranged as spatially separated from each other along the second long side LS2, on the side where the second long side LS2 of the photogate electrode PG exists. The second semiconductor regions FD2 are also arranged as spatially separated from the region immediately below the photogate electrode PG. Namely, the second semiconductor regions FD2 are arranged as spatially separated from the light receiving region, on the side where the other long side of the light receiving region exists.

The first semiconductor regions FD1 and the second semiconductor regions FD2 are opposed to each other with the photogate electrode PG (light receiving region) in between, in the direction in which the first and second long sides LS1, LS2 are opposed. The first and second semiconductor regions FD1, FD2 are rectangular on the plan view. A value of a ratio of the length in the direction in which the first and second long sides LS1, LS2 are opposed and the length in the direction in which the first and second short sides SS1, SS2 are opposed, of the first and second semiconductor regions FD1, FD2 is set, for example, to about 1:0.5 to 1:2. In the present embodiment, the first and second semiconductor regions FD1, FD2 are square. The first and second semiconductor regions FD1, FD2 function as signal charge collecting regions. The first and second semiconductor regions FD1, FD2 are regions comprised of an n-type semiconductor with a high impurity concentration, and floating diffusion regions.

The first gate electrodes TX1 are provided each between the photogate electrode PG (light receiving region) and the first semiconductor region FD1. The second gate electrodes TX2 are provided each between the photogate electrode PG (light receiving region) and the second semiconductor region FD2. The first and second gate electrodes TX1, TX2 are rectangular on the plan view. In the present embodiment, the first and second gate electrodes TX1, TX2 are of a rectangular shape the long-side direction of which is the direction in which the first and second short sides SS1, SS2 are opposed. A value of a ratio of the length in the short-side direction and the length in the long-side direction, of the first and second gate electrodes TX1, TX2 is set, for example, to about 1:2 to 1:15. The first and second gate electrodes TX1, TX2 are comprised of polysilicon but these may be comprised of another material. The first and second gate electrodes TX1, TX2 function as transfer electrodes.

The third semiconductor regions FD3 are arranged as spatially separated from the first semiconductor regions FD1 with the first semiconductor regions FD1 in between in the direction in which the first and second short sides SS1, SS2 are opposed, on the side where the first long side LS1 of the photogate electrode PG exists. Similarly, the third semiconductor regions FD3 are also arranged as spatially separated from the second semiconductor regions FD2 with the second semiconductor regions FD2 in between in the direction in which the first and second short sides SS1, SS2 are opposed, on the side where the second long side LS2 of the photogate electrode PG exists. The third semiconductor regions FD3 are opposed to each other with the photogate electrode PG (light receiving region) in between, in the direction in which the first and second long sides LS1, LS2 are opposed.

The third semiconductor regions FD3 are rectangular on the plan view. In the present embodiment, the third semiconductor regions FD3 are of a rectangular shape. The third semiconductor regions FD3 function as unnecessary charge collecting regions. The third semiconductor regions FD3 are regions comprised of an n-type semiconductor with a high impurity concentration, and floating diffusion regions.

The third gate electrodes $TX3_1$, $TX3_2$ are provided each between the corresponding third semiconductor region FD3 and the photogate electrode PG (light receiving region). The third gate electrodes $TX3_1$ are arranged as separated from the first or second gate electrodes TX1, TX2 between the first or second gate electrodes TX1, TX2 in the direction in which the first and second short sides SS1, SS2 are opposed, beside the respective long sides LS1, LS2 of the photogate electrode PG. The third gate electrodes $TX3_2$ are arranged along the corners of the photogate electrode PG (light receiving region). The third gate electrodes $TX3_1$, $TX3_2$ are arranged as separated from the first or second gate electrodes TX1, TX2 with the first or second gate electrodes TX1, TX2 in between in the direction in which the first and second short sides SS1,SS2 are opposed, beside the respective long sides LS1, LS2 of the photogate electrode PG.

Each of the third gate electrodes $TX3_1$, $TX3_2$ has a first electrode portion TX3a extending in the direction in which the first and second short sides SS1, SS2 are opposed, and a second electrode portion TX3b extending in the direction in which the first and second long sides LS1, LS2 are opposed. The third gate electrodes $TX3_1$, $TX3_2$ are comprised of polysilicon but these may be comprised of another material. The third gate electrodes $TX3_1$, $TX3_2$ function as unnecessary charge collecting gate electrodes to selectively perform blocking and opening of an unnecessary charge flow into the unnecessary charge collecting regions.

In the third gate electrodes $TX3_1$, the first electrode portion TX3a and the second electrode portion TX3b each are rectangular and continuous, and the third gate electrodes $TX3_1$ are of a T-shape. The width in the direction in which the first and second short sides SS1, SS2 are opposed, of the second electrode portion TX3b of each third gate electrode $TX3_1$ is set to be smaller than the width in the direction in which the first and second short sides SS1, SS2 are opposed, of the first electrode portion TX3a of the third gate electrode $TX3_1$. The second electrode portions TX3b of the third gate electrodes $TX3_1$ are located so as to overlap with the light receiving region. Namely, the second electrode portions TX3b of the third gate electrodes $TX3_1$ are exposed from the aperture LIa of the light shielding layer LI.

A value of a ratio of the width in the direction in which the first and second short sides SS1, SS2 are opposed and the width in the direction in which the first and second long sides LS1, LS2 are opposed, of the first electrode portions TX3a of the third gate electrodes $TX3_1$, is set, for example, to about 1:2 to 1:15. A value of a ratio of the width in the direction in which the first and second short sides SS1, SS2 are opposed and the width in the direction in which the first and second long sides LS1, LS2 are opposed, of the second electrode portions TX3b of the third gate electrodes $TX3_1$, is set, for example, to about 1:2 to 1:15.

In the third gate electrodes $TX3_2$, the first electrode portion TX3a and the second electrode portion TX3b each are rectangular and continuous, and the third gate electrodes $TX3_2$ are of an L-shape. The third gate electrodes $TX3_2$ are covered by the light shielding layer LI so as not to be exposed from the aperture LIa.

The photogate electrode PG has a partly indented shape on the plan view so as to avoid the second electrode portions TX3b of the third gate electrodes $TX3_1$, on each of the sides where the long sides LS1, LS2 exist. The second electrode portions TX3b of the third gate electrodes $TX3_1$ are surrounded by the photogate electrode PG on the plan view. Specifically, the second electrode portion TX3b of each third gate electrode $TX3_1$ is surrounded by the photogate electrode PG across three sides included in the edges of the second electrode portion TX3b.

The thicknesses/impurity concentrations of the respective regions are as described below.

First substrate region 1Aa of semiconductor substrate 1A: thickness 5-700 µm/impurity concentration $1\times10^{18}$-$10^{20}$ cm$^{-3}$ Second substrate region 1Ab of semiconductor substrate 1A: thickness 3-30 µm/impurity concentration $1\times10^{13}$-$10^{16}$ cm$^{-3}$ First and second semiconductor regions FD1, FD2: thickness 0.1-0.4 µm/impurity concentration $1\times10^{18}$-$10^{20}$ cm$^{-3}$ Third semiconductor regions FD3: thickness 0.1-0.4 µm/impurity concentration $1\times10^{18}$-$10^{20}$ cm$^{-3}$ The insulating layer 1E is provided with contact holes for exposing the surfaces of the first to third semiconductor regions FD1, FD2, FD3. Conductors 11 to connect the first to third semiconductor regions FD1, FD2, FD3 to the outside are arranged in the contact holes.

The light shielding layer LI covers the regions where there are the first and second gate electrodes TX1, TX2, the third gate electrodes $TX3_2$, the first electrode portions TX3a of the third gate electrodes $TX3_1$, and the first to third semiconductor regions FD1, FD2, FD3 arranged on the semiconductor substrate 1A, so as to prevent the light from being incident upon the regions. This can prevent generation of unnecessary charge due to the light incident on the above-mentioned regions.

The region corresponding to the photogate electrode PG in the semiconductor substrate 1A (region immediately below the photogate electrode PG) functions as a charge generating region to generate charge according to incident light. Since the third gate electrodes $TX3_1$, $TX3_2$ are comprised of polysilicon, the light is transmitted through the second electrode portions TX3b of the third gate electrodes $TX3_1$ to be incident on the semiconductor substrate 1A. Therefore, the regions immediately below the second electrode portions TX3b of the third gate electrodes $TX3_1$ in the semiconductor substrate 1A also function as charge generating regions. For this reason, the charge generating region has a rectangular shape having a pair of long sides opposed to each other and a pair of short sides opposed to each other. The shape of the light receiving region agrees with the shape of the charge generating region. The second electrode portions TX3b are also located as overlapping with the charge generating region. If the third gate electrodes $TX3_1$, $TX3_2$ are comprised of a material that does not transmit the light, the charge generating region is defined by the photogate electrode PG. In this case, the shape of the light receiving region does not agree with the shape of the charge generating region.

When a high-level signal (positive electrical potential) is supplied to the first and second gate electrodes TX1, TX2, a potential below the first and second gate electrodes TX1, TX2 becomes lower than a potential of the region immediately below the photogate electrode PG in the semiconductor substrate 1A. This results in drawing negative charge (electrons) toward the first and second gate electrodes TX1, TX2 and accumulating the negative charge in potential wells formed by the first and second semiconductor regions FD1, FD2. An n-type semiconductor contains a positively ionized donor and has a positive potential, so as to attract electrons. When a low-level signal (ground electrical potential) is supplied to the first and second gate electrodes TX1, TX2, the first and second gate electrodes TX1, TX2 form potential barriers. Therefore, the charge generated in the semiconductor substrate 1A is not drawn into the first and second semiconductor regions FD1, FD2.

The third semiconductor regions FD3 collect unnecessary charge generated in the charge generating region according to incidence of light. When light is incident into one pixel, a part of charge generated in the charge generating region migrates as unnecessary charge toward the third gate electrodes $TX3_1$, $TX3_2$ in accordance with a potential gradient formed by voltages applied to the photogate electrode PG and the third gate electrodes $TX3_1$, $TX3_2$.

When a high-level signal (positive electrical potential) is supplied to the third gate electrodes $TX3_1$, $TX3_2$, a potential of the regions immediately below the third gate electrodes $TX3_1$, $TX3_2$ becomes lower than a potential of the region immediately below the photogate electrode PG in the semiconductor substrate 1A. This causes negative charge (electrons) to be drawn toward the third gate electrodes $TX3_1$, $TX3_2$ and to flow into potential wells formed by the third semiconductor regions FD3. When a low-level signal (ground electrical potential) is supplied to the third gate electrodes $TX3_1$, $TX3_2$, the third gate electrodes $TX3_1$, $TX3_2$ form potential barriers. Therefore, the charge generated in the semiconductor substrate 1A is not drawn into the third semiconductor regions FD3.

In the range image sensor 1, the charge generated in the deep portion of semiconductor in response to incidence of light for projection of light is drawn into the potential wells formed on the light incident surface 1FT side. This enables fast and accurate distance measurement.

The pulsed light $L_D$ from the object, which is incident through the light incident surface 1FT of the semiconductor substrate 1A, reaches to the light receiving region (charge generating region) provided on the front surface side of the semiconductor substrate 1A. Charge generated in the semiconductor substrate 1A with incidence of the pulsed light is distributed from the charge generating region (region immediately below the photogate electrode PG) into the regions immediately below the first and second gate electrodes TX1, TX2 adjacent thereto. Namely, when the detection gate signals $S_1$, $S_2$ in synchronism with the drive signal $S_P$ of the light source are alternately supplied through the wiring board 10 to the first and second gate electrodes TX1, TX2, charges generated in the charge generating region flow respectively to the regions immediately below the first and second gate electrodes TX1, TX2 and then flow therefrom into the first and second semiconductor regions FD1, FD2.

The ratio to the total charge quantity (Q1+Q2), of the charge quantity Q1, Q2 accumulated in the first semiconductor regions FD1 or in the second semiconductor regions FD2 corresponds to the phase difference between the emitted pulsed light, which was emitted with supply of the drive signal $S_P$ to the light source, and the detected pulsed light, which returned after reflection of the emitted pulsed light from the object H.

The range image sensor 1 is provided with a back gate semiconductor region for fixing the electrical potential of the semiconductor substrate 1A to a reference electrical potential, which is not illustrated.

FIGS. 8 and 9 are drawings showing potential profiles near the light incident surface 1FT of the semiconductor substrate 1A, for explaining the accumulation operation of signal charge. In FIGS. 8 and 9, the downward direction corresponds to the positive direction of potential. FIG. 8 shows the potential profiles along the line V-V in FIG. 4. In FIG. 9, (a) shows the potential profile along the line VI-VI in FIG. 4 and (b) the potential profile along the line VII-VII in FIG. 4.

Upon incidence of light, the potential $\Phi_{PG}$ of the region immediately below the photogate electrode PG is set slightly higher than the substrate electrical potential, by the electrical potential given to the photogate electrode PG (intermediate electrical potential between the higher electrical potential and the lower electrical potential supplied to the first and second gate electrodes TX1, TX2). Shown in the drawings are the potential $\Phi_{TX1}$ of the regions immediately below the first gate electrodes TX1, the potential $\Phi_{TX2}$ of the regions immediately below the second gate electrodes TX2, the potential $\Phi_{TX3}$ of the regions immediately below the third gate electrodes $TX3_1$, $TX3_2$, the potential $\Phi_{FD1}$ of the first semiconductor regions FD1, the potential $\Phi_{FD2}$ of the second semiconductor regions FD2, and the potential $\Phi_{FD3}$ of the third semiconductor regions FD3.

When the high electrical potential of the detection gate signal $S_1$ is applied to the first gate electrodes TX1, the charge generated immediately below the photogate electrode PG flows through the regions immediately below the first gate electrodes TX1 in accordance with a potential gradient to be accumulated in the potential wells of the first semiconductor regions FD1, as shown in (a) of FIG. 8. The charge quantity Q1 is accumulated in the potential wells of the first semiconductor regions FD1.

When the high electrical potential of the detection gate signal $S_2$ is applied to the second gate electrodes TX2 in succession to the detection gate signal $S_1$, the charge generated immediately below the photogate electrode PG flows through the regions immediately below the second gate electrodes TX2 in accordance with a potential gradient to be accumulated in the potential wells of the second semiconductor regions FD2, as shown in (b) of FIG. 8. The charge quantity Q2 is accumulated in the potential wells of the second semiconductor regions FD2.

In this connection, the ground electrical potential is supplied to the third gate electrodes $TX3_1$, $TX3_2$ during the periods in which the detection gate signals $S_1$, $S_2$ are applied to the first and second gate electrodes TX1, TX2. For this reason, as shown in (a) and (b) of FIG. 9, the potential $\Phi_{TX3}$ of the regions immediately below the third gate electrodes $TX3_1$, $TX3_2$ is not lowered, and therefore the charge does not flow into the potential wells of the third semiconductor regions FD3.

At this time, the second electrode portions TX3b of the third gate electrodes $TX3_1$ are located so as to overlap with the light receiving region (charge generating region) in the direction in which the first and second short sides SS1, SS2 are opposed, whereby the potential $\Phi_{PG}$ of the region immediately below the photogate electrode PG is increased on the second electrode portion TX3b side of each third gate electrode $TX3_1$. Accordingly, in the region immediately below the photogate electrode PG there are potential gradients formed so as to decrease from the second electrode portion TX3b side of each third gate electrode $TX3_1$ toward the regions between the first and second semiconductor regions FD1, FD2, in the direction in which the first and second short sides SS1, SS2 are opposed.

The charge generated near the second electrode portions TX3b of the third gate electrodes $TX3_1$ in the region immediately below the photogate electrode PG is accelerated according to the foregoing potential gradients formed by the second electrode portions TX3b to quickly migrate toward the regions located between the first and second semiconductor regions FD1, FD2. Then the migrating charge is accumulated in the potential wells of the first or second semiconductor regions FD1, FD2 through the regions immediately below the first or second gate electrodes TX1, TX2 in accordance with the potential gradient formed by an electric field established by the first gate electrodes TX1 and the first semiconductor regions FD1 or by an electric field established by the second gate electrodes TX2 and the second semiconductor regions FD2, as described above. Therefore, the charge generated in the charge generating region is accumulated as signal charge in the potential wells of the first and second semiconductor regions FD1, FD2.

FIG. 10 is a drawing showing potential profiles near the light incident surface 1FT of the semiconductor substrate 1A, for explaining the discharge operation of unnecessary charge. In FIG. 10, the downward direction corresponds to the positive direction of potential. In FIG. 10, (a) shows the potential profile along the line VI-VI in FIG. 4 and (b) the potential profile along the line VII-VII in FIG. 4.

When a low-level electrical potential, e.g., the ground electrical potential is supplied to the first and second gate electrodes TX1, TX2, the potential of the regions immediately below the first and second gate electrodes TX1, TX2 is not lowered, as described above. For this reason, no charge flows into the potential wells of the first and second semiconductor regions FD1, FD2. On the other hand, when a positive electrical potential is supplied to the third gate electrodes $TX3_1$, $TX3_2$, the charge generated in the charge generating region flows into the potential wells of the third semiconductor regions FD3 because of decrease in the potential $\Phi_{TX3}$ of the regions immediately below the third gate electrodes $TX3_1$, $TX3_2$, as shown in (a) and (b) of FIG. 10. By the above operation, the charge generated in the charge generating region is collected as unnecessary charge in the potential wells of the third semiconductor regions FD3. The unnecessary charge collected in the potential wells of the third semiconductor regions FD3 is discharged to the outside.

Figure 11:
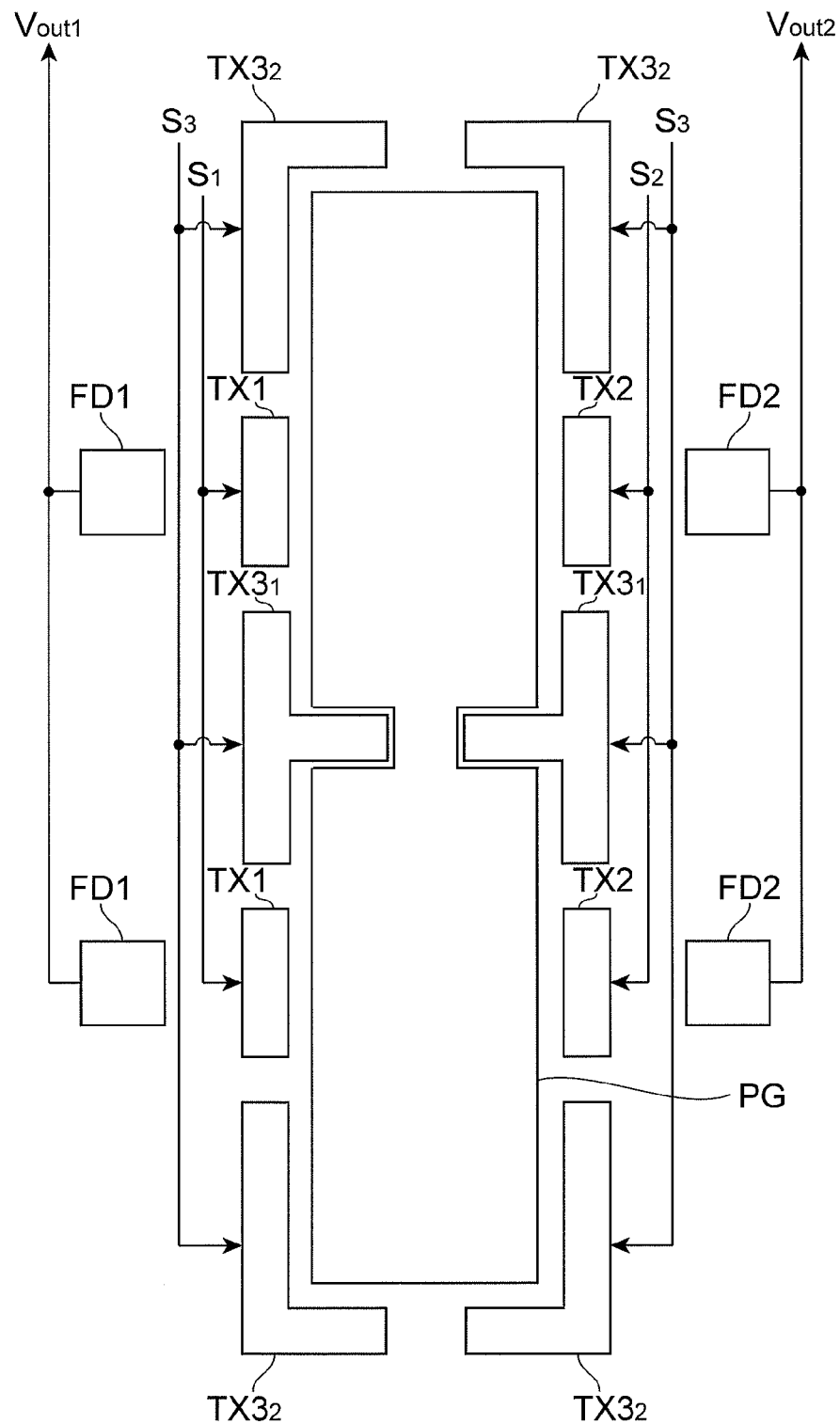
FIG. 11 is a schematic drawing for explaining a configuration of a pixel.

FIG. 11 is a schematic drawing for explaining a configuration of a pixel.

The detection gate signal $S_1$ is supplied to the first gate electrodes TX1. The detection gate signal $S_2$ is supplied to the second gate electrodes TX2. Namely, the charge transfer signals of different phases are supplied respectively to the first gate electrodes TX1 and to the second gate electrodes TX2. The charge transfer signal $S_3$ is supplied to the third gate electrodes $TX3_1$, $TX3_2$. The charge transfer signal $S_3$ is supplied from the controlling circuit 2.

When the detection gate signal $S_1$ of the high level is supplied to the first gate electrodes TX1, the charge generated in the charge generating region flows as signal charge into the potential wells composed of the first semiconductor regions FD1. The signal charge accumulated in the first semiconductor regions FD1 is read out as output ($V_{out1}$) corresponding to the accumulated charge quantity $Q_1$ from the first semiconductor regions FD1. When the detection gate signal $S_2$ of the high level is supplied to the second gate electrodes TX2, the charge generated in the charge generating region flows as signal charge into the potential wells composed of the second semiconductor regions FD2. The signal charge accumulated in the second semiconductor regions FD2 is read out as output ($V_{out2}$) corresponding to the accumulated charge quantity $Q_2$ from the second semiconductor regions FD2. These outputs ($V_{out1}$, $V_{out2}$) correspond to the aforementioned signals d'(m, n).

Figure 12:
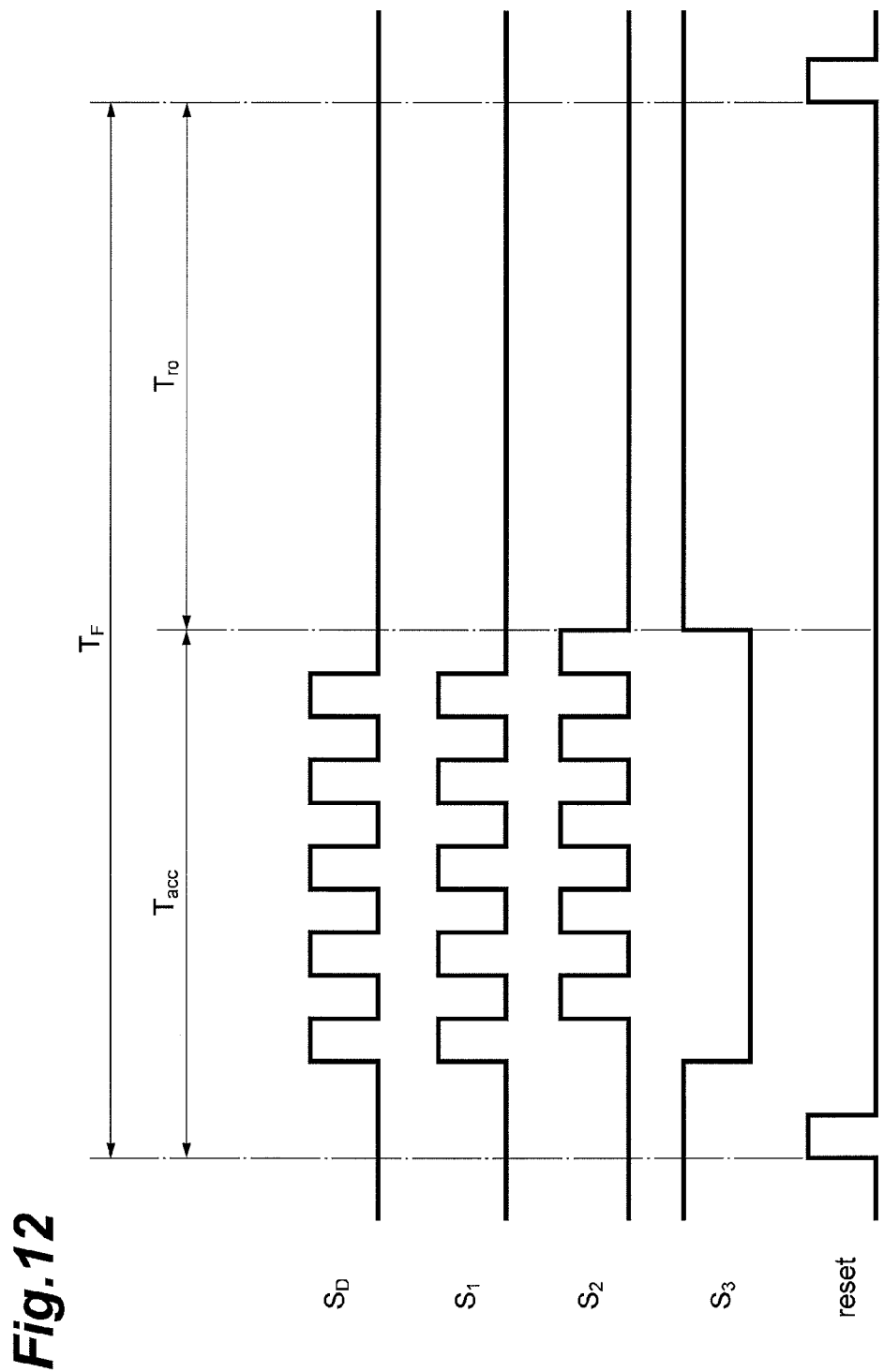
FIG. 12 is a timing chart of various signals.

FIG. 12 is a timing chart of actual various signals.

A period $T_F$ of one frame consists of a period for accumulation of signal charge (accumulation period) $T_{acc}$, and a period for readout of signal charge (readout period) $T_{ro}$. With focus on one pixel, a signal based on the pulse drive signal $S_P$ having a plurality of pulses is applied to the light source during the accumulation period $T_{acc}$ and, in synchronism therewith, the detection gate signals $S_1$, $S_2$ are applied in mutually opposite phases to the first and second gate electrodes TX1, TX2. Prior to the distance measurement, a reset signal reset is applied to the first and second semiconductor regions FD1, FD2 to discharge charge accumulated inside, to the outside. In the present example, the reset signal reset is instantaneously turned on and then turned off, and thereafter a plurality of drive oscillating pulses are sequentially applied. Furthermore, in synchronism therewith, the charge transfer is sequentially performed to accumulate the signal charge in the first and second semiconductor regions FD1, FD2 in an integrating manner. Thereafter, during the readout period $T_{ro}$, the signal charges accumulated in the first and second semiconductor regions FD1, FD2 are read out. At this time the charge transfer signal $S_3$ applied to the third gate electrodes $TX3_1$, $TX3_2$ is turned to the high level to give the positive electrical potential to the third gate electrodes $TX3_1$, $TX3_2$, whereby unnecessary charge is collected into the potential wells of the third semiconductor regions FD3.

For distribution of charge, normally, a positive high-level detection signal is supplied to the one gate electrodes (e.g., the first gate electrodes TX1) out of the first gate electrodes TX1 and the second gate electrodes TX2, and a detection signal with a phase shift of 180° is supplied to the other gate electrodes (e.g., the second gate electrodes TX2). In this operation, when the lower level (e.g., the ground electrical potential) is applied as the detection signal applied to the other gate electrodes (e.g., the second gate electrodes TX2), the potential immediately below the second gate electrodes TX2 is raised to form a potential peak. This makes the charge hard to flow from the photogate electrode PG side to the second semiconductor regions FD2, which can suppress generation of unnecessary noise component.

In the present embodiment, as described above, the planar shape of the charge generating region (light receiving region) is set to be the rectangular shape. This increases the area of the charge generating region, so as to enhance the sensitivity of the range image sensor 1 and increase the transfer rate of charge to the first and second semiconductor regions FD1, FD2.

In the present embodiment, the first and second semiconductor regions FD1, FD2 are set so that the length thereof in the direction in which the first and second short sides SS1, SS2 are opposed is extremely smaller than the length of the photogate electrode PG in the direction in which the first and second short sides SS1, SS2 are opposed, and so that the area of the first and second semiconductor regions FD1, FD2 is also smaller than the area of the photogate electrode PG. For this reason, the area of the first and second semiconductor regions FD1, FD2 is relatively significantly reduced relative to the area of the region available for transfer of charge to the first and second semiconductor regions FD1, FD2 in the region immediately below the photogate electrode PG (charge generating region). The charges transferred and accumulated in the first and second semiconductor regions FD1, FD2 (charge quantities Q1, Q2) cause respective voltage changes ($\Delta V$) represented by relational expressions below, because of the capacitance (Cfd) of the first and second semiconductor regions FD1, FD2.

$$\Delta V = Q1/Cfd$$

$$\Delta V = Q2/Cfd$$

Therefore, the decrease in the area of the first and second semiconductor regions FD1, FD2 also leads to a decrease in the capacitance (Cfd) of the first and second semiconductor regions FD1, FD2, so as to cause larger voltage changes ($\Delta V$). Namely, it results in increasing a charge-voltage conversion gain. From this point as well, the sensitivity of the range image sensor 1 is enhanced.

Incidentally, in the regions immediately below the third gate electrodes $TX3_1$, $TX3_2$, the potential is raised to prevent the charge from being transferred as unnecessary charge to the third semiconductor regions FD3, during the operation in which the charge generated in the charge generating region is transferred as signal charge to the first and second semiconductor regions FD1, FD2. For this reason, the charge generated near the regions immediately below the second electrode portions TX3b of the third gate electrodes $TX3_1$ becomes easier to migrate toward the regions located between the first and second semiconductor regions FD1, FD2 in the light receiving region (charge generating region), because of the potential difference. The charge having migrated toward the aforementioned regions located between the first and second semiconductor regions FD1, FD2 is quickly transferred by the electric field established by the first gate electrodes TX1 and the first semiconductor regions FD1 or by the electric field established by the second gate electrodes TX2 and the second semiconductor regions FD2. Therefore, the charge generated in the charge generating region can be quickly transferred as signal charge, even in the case where the area is increased by setting the planar shape of the light receiving region (charge generating region) to the rectangular shape and in the case where the sensitivity is enhanced by setting the area of the first and second semiconductor regions FD1, FD2 extremely small.

The width in the direction in which the first and second short sides SS1, SS2 are opposed, of the second electrode portions TX3b of the third gate electrodes $TX3_1$ is set smaller than that of the first electrode portions TX3a. For this reason, the area of the regions immediately below the second electrode portions TX3b of the third gate electrodes $TX3_1$ is relatively small and therefore the quantity of charge hard to migrate as staying in the regions immediately below the second electrode portions TX3b of the third gate electrodes $TX3_1$ is extremely small. As a consequence, it is feasible to prevent the third gate electrodes $TX3_1$ from impeding the enhancement of sensitivity because of the possession of the second electrode portions TX3b. The quantity of unnecessary charge is also extremely small as quantity of charge hard to migrate as staying in the regions immediately below the second electrode portions TX3b of the third gate electrodes $TX3_1$. Therefore, the unnecessary charge is appropriately discharged, so as not to impede improvement in accuracy of distance measurement.

The third gate electrodes $TX3_1$, $TX3_2$ are given an electrical potential such that the potential in the regions immediately below the third gate electrodes $TX3_1$, $TX3_2$ (the second electrode portions TX3b) is higher than the potential in the regions located between the first and second semiconductor regions FD1, FD2 in the light receiving region, during the operation of blocking the flow of unnecessary charge to the third semiconductor regions FD3. This allows stable establishment of the potential, particularly, in the regions immediately below the second electrode portions TX3b of the third gate electrodes $TX3_1$.

Figure 13:
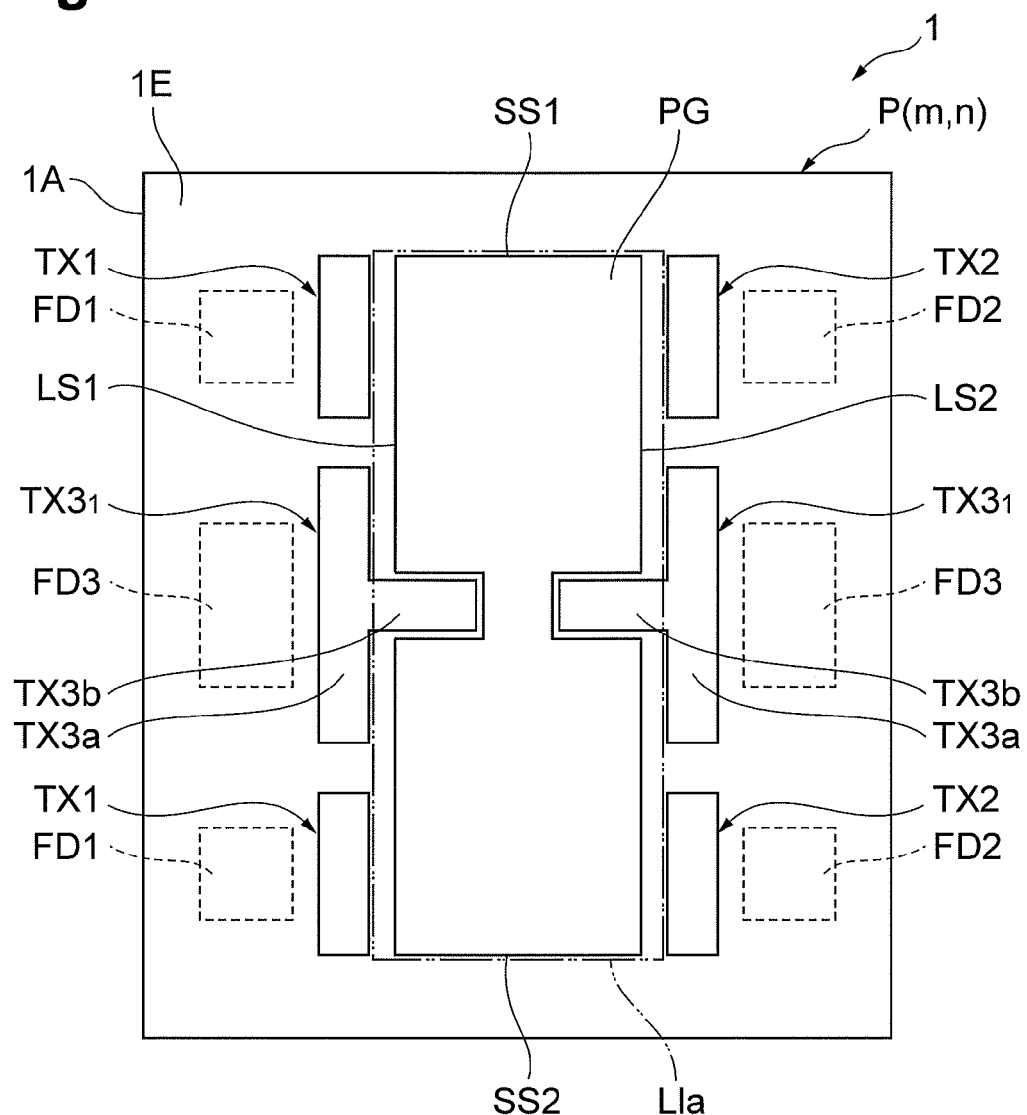
FIG. 13 is a schematic drawing for explaining a configuration of a pixel in a modification example of the range image sensor.

Next, a modification example of the range image sensor 1 will be described with reference to FIG. 13. FIG. 13 is a schematic drawing for explaining a configuration of a pixel in the modification example of the range image sensor. The present modification example is different from the above embodiment in that the sensor is not provided with the third gate electrodes $TX3_2$. In FIG. 13, the illustration of conductors 11 is omitted.

The range image sensor 1 has, in each pixel P(m, n), a photogate electrode PG, a plurality of first gate electrodes TX1 and second gate electrodes TX2 (two each in the present embodiment), a plurality of third gate electrodes $TX3_1$ (two in the present embodiment), a plurality of first semiconductor regions FD1 and second semiconductor regions FD2 (two each in the present embodiment), and a plurality of third semiconductor regions FD3 (two in the present embodiment).

In the present modification example, as in the case of the above embodiment, the charge generated in the charge generating region can be quickly transferred as signal charge, even in the case where the area is increased by setting the planar shape of the light receiving region (charge generating region) to the rectangular shape and in the case where the sensitivity is enhanced by setting the area of the first and second semiconductor regions FD1, FD2 extremely small.

Figure 14:
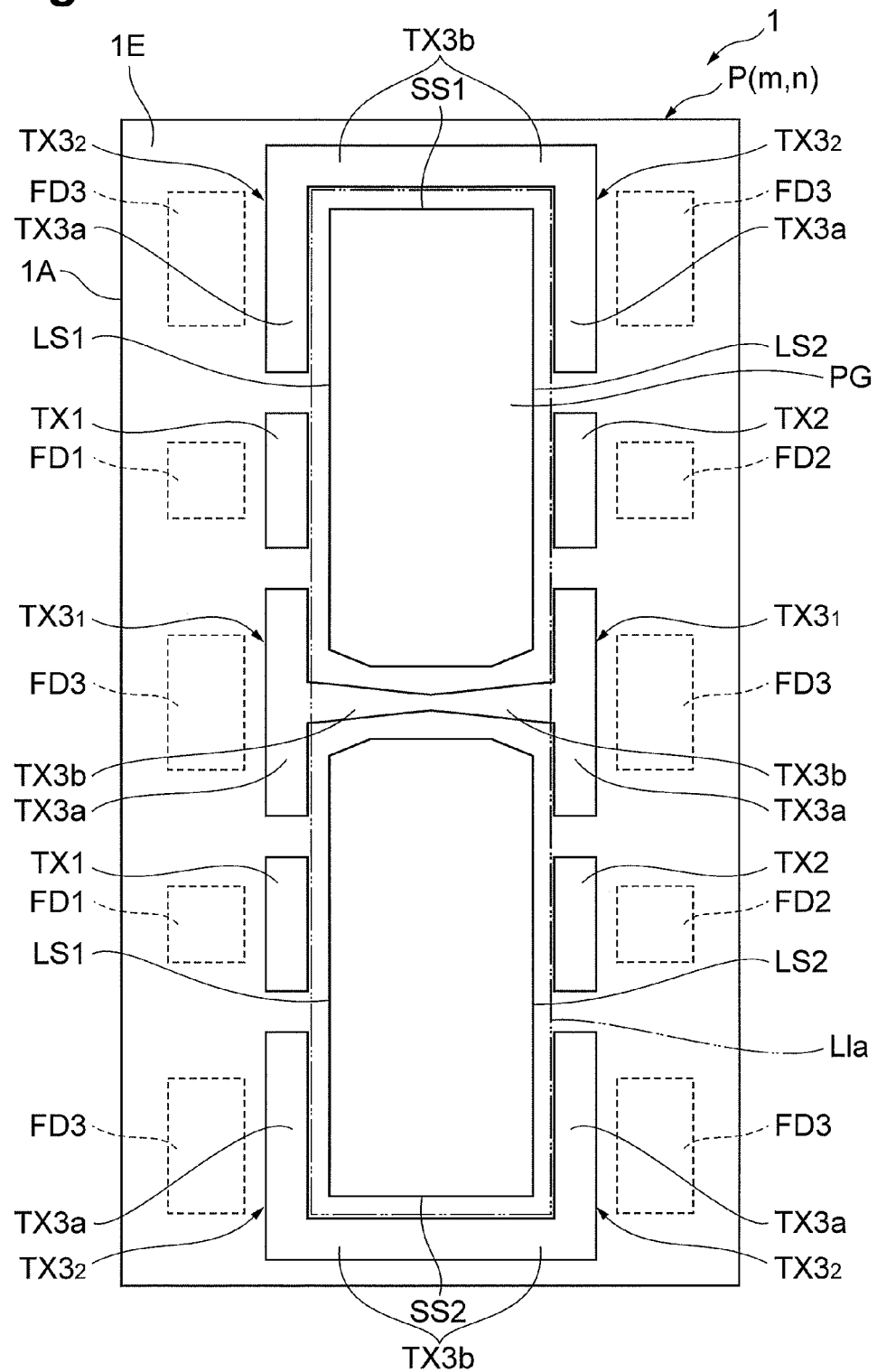
FIG. 14 is a schematic drawing for explaining a configuration of a pixel in a modification example of the range image sensor.
Figure 15:
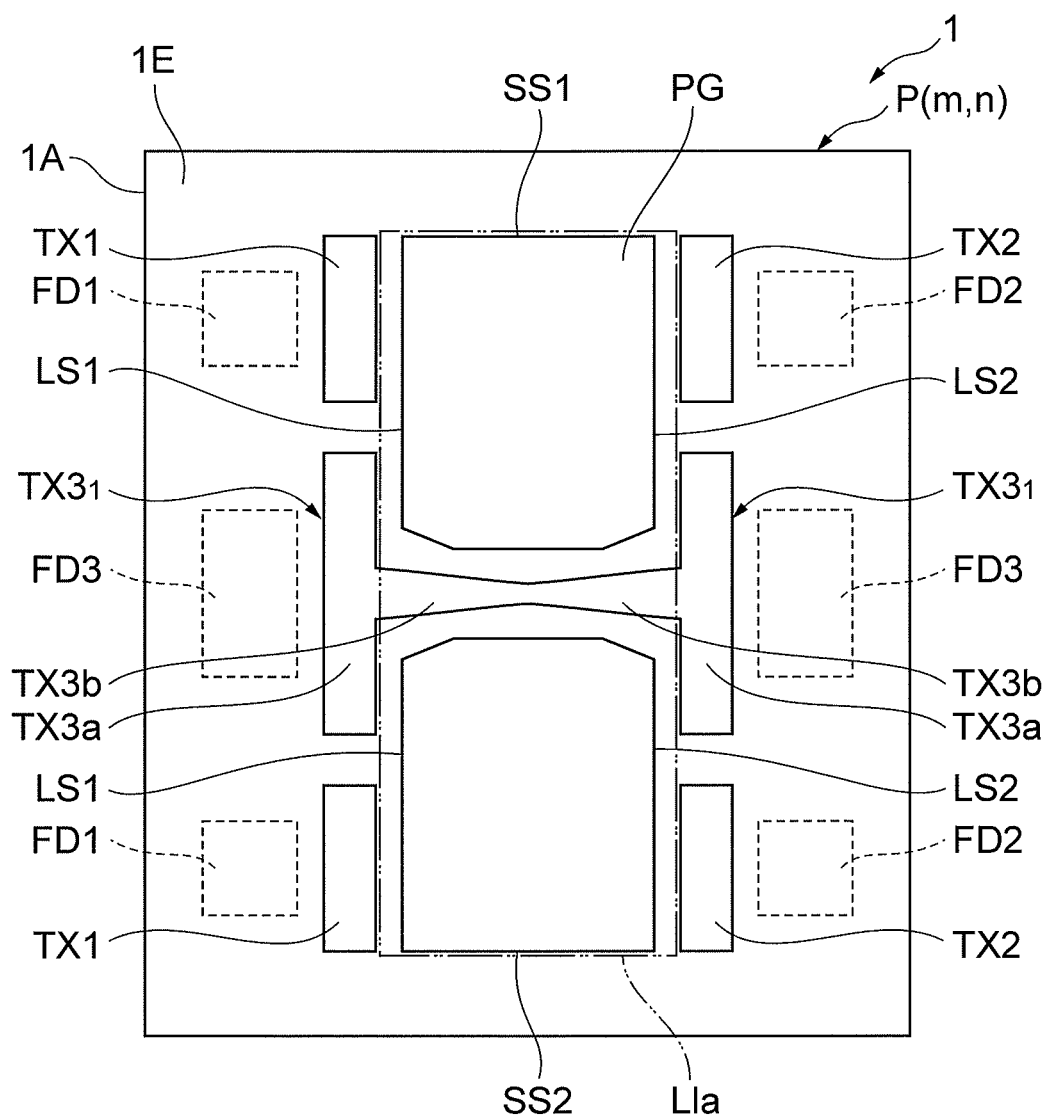
FIG. 15 is a schematic drawing for explaining a configuration of a pixel in a modification example of the range image sensor.

Next, modification examples of the range image sensor 1 will be described with reference to FIGS. 14 and 15. FIGS. 14 and 15 are schematic drawings for explaining a configuration of a pixel in the modification examples of the range image sensor. These modification examples are different in the shape of the second electrode portions TX3b from the above embodiment and the modification example shown in FIG. 13. In FIGS. 14 and 15, the illustration of conductors 11 is also omitted.

In these modification examples, the second electrode portions TX3b of the third gate electrodes $TX3_1$, $TX3_2$ opposed in the direction in which the first and second long sides LS1, LS2 are opposed, are continuous with each other so as to be integrated. Particularly, the second electrode portions TX3b of the third gate electrodes $TX3_1$ are continuous with each other, whereby the photogate electrode PG is divided into a plurality of pieces (two in the modification examples) in the present modification examples.

The second electrode portion TX3b of each third gate electrode $TX3_1$ becomes narrower in the width in the direction in which the first and second short sides SS1, SS2 are opposed, with distance from the first electrode portion TX3a. The integrated form of second electrode portions TX3b has the narrowest width in the direction in which the first and second short sides SS1, SS2 are opposed, in a central region in the direction in which the first and second long sides LS1, LS2 are opposed, and then gradually increases the width from the central region.

In the present modification examples, the second electrode portions TX3b of the third gate electrodes $TX3_1$ are continuous with each other in the direction in which the first and second long sides LS1, LS2 are opposed. For this reason, the charge generated near the regions immediately below the second electrode portions TX3b of the third gate electrodes $TX3_1$ and in the central region in the direction in which the first and second long sides LS1, LS2 are opposed in the light receiving region, is more likely to migrate toward the regions located between the first and second semiconductor regions FD1, FD2. As a consequence, the sensitivity can be further enhanced.

The width in the direction in which the first and second short sides SS1, SS2 are opposed, of the second electrode portion TX3b of each third gate electrode $TX3_1$ becomes narrower with distance from the first electrode portion TX3a. For this reason, the area of the region immediately below the second electrode portion TX3b of the third gate electrode TX3₁ becomes much smaller, so as to further decrease the quantity of charge hard to migrate as staying in the region immediately below the second electrode portion TX3b. As a consequence, it is feasible to further suppress the second electrode portions TX3b of the third gate electrodes TX3₁ from impeding the improvement in accuracy of distance measurement and the enhancement of sensitivity.

Figure 16:
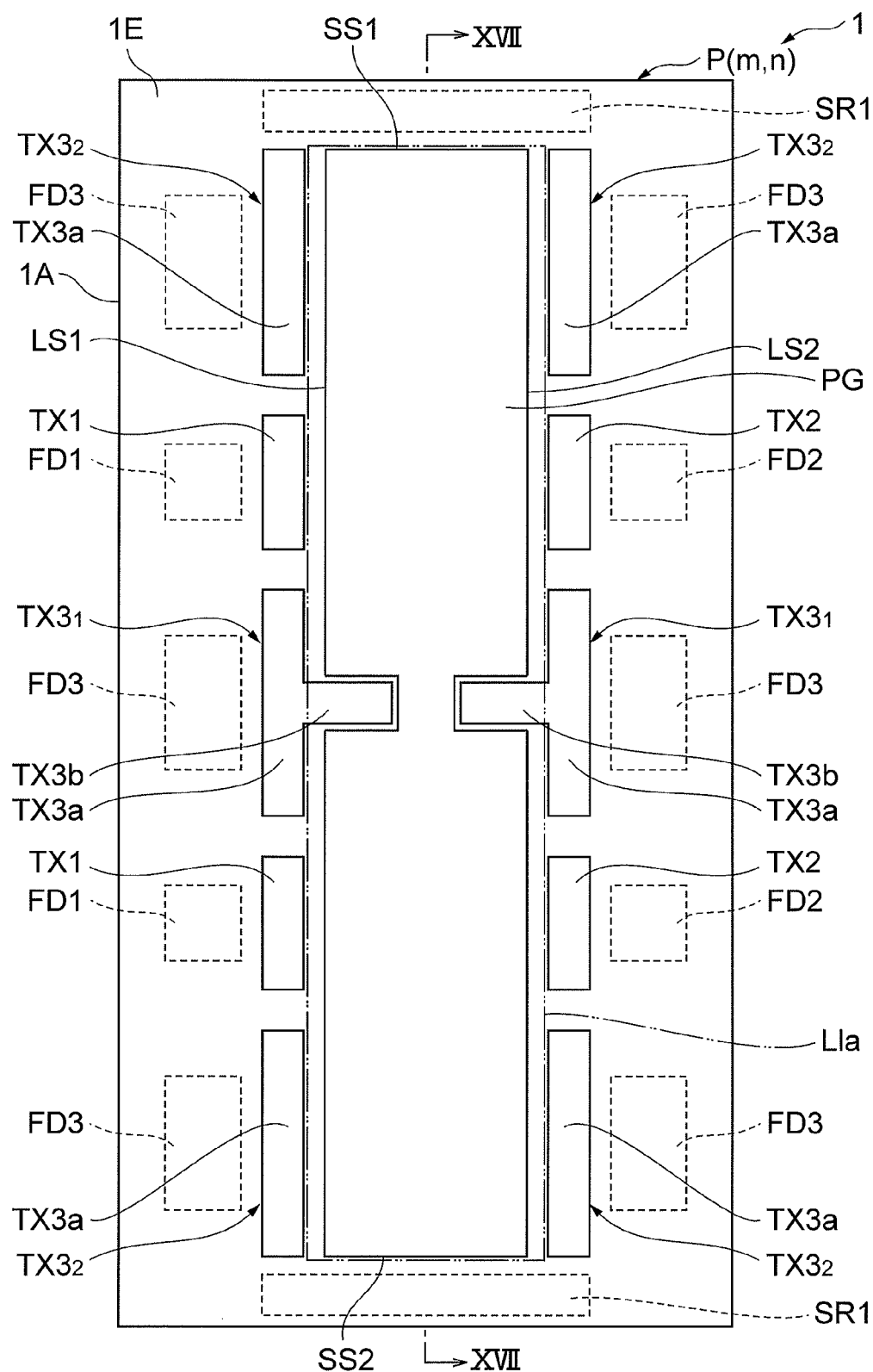
FIG. 16 is a schematic drawing for explaining a configuration of a pixel in a modification example of the range image sensor.
Figure 17:
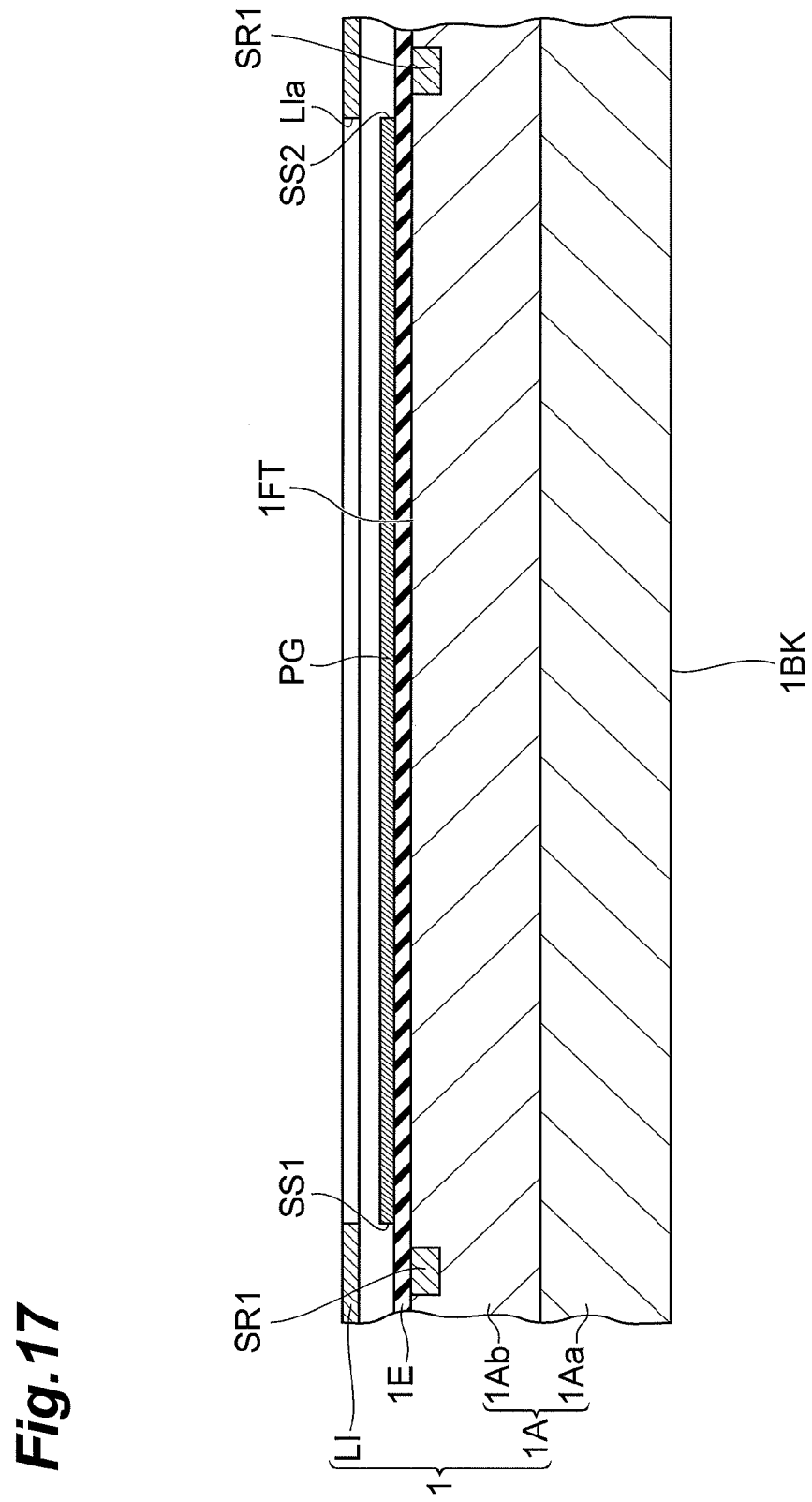
FIG. 17 is a drawing showing a cross-sectional configuration along the line XVII-XVII in FIG. 16.

Next, a modification example of the range image sensor 1 will be described with reference to FIGS. 16 and 17. FIG. 16 is a schematic drawing for explaining a configuration of a pixel in the modification example of the range image sensor. FIG. 17 is a drawing showing a cross-sectional configuration along the line XVII-XVII in FIG. 16. The present modification example is different from the above embodiment in that the sensor is further provided with fourth semiconductor regions SR1. In FIG. 16, the illustration of conductors 11 is also omitted.

The fourth semiconductor regions SR1 are arranged along the first and second short sides SS1, SS2, respectively, beside the first and second short sides SS1, SS2 of the photogate electrode PG. Namely, the fourth semiconductor regions SR1 are arranged opposite to each other with the photogate electrode PG (light receiving region and charge generating region) in between in the direction in which the first and second short sides SS1, SS2 are opposed. The fourth semiconductor regions SR1 are rectangular on the plan view. In the present modification example the fourth semiconductor regions SR1 have a rectangular shape the long-side direction of which is the direction in which the first and second long sides LS1, LS2 are opposed.

Figure 18:
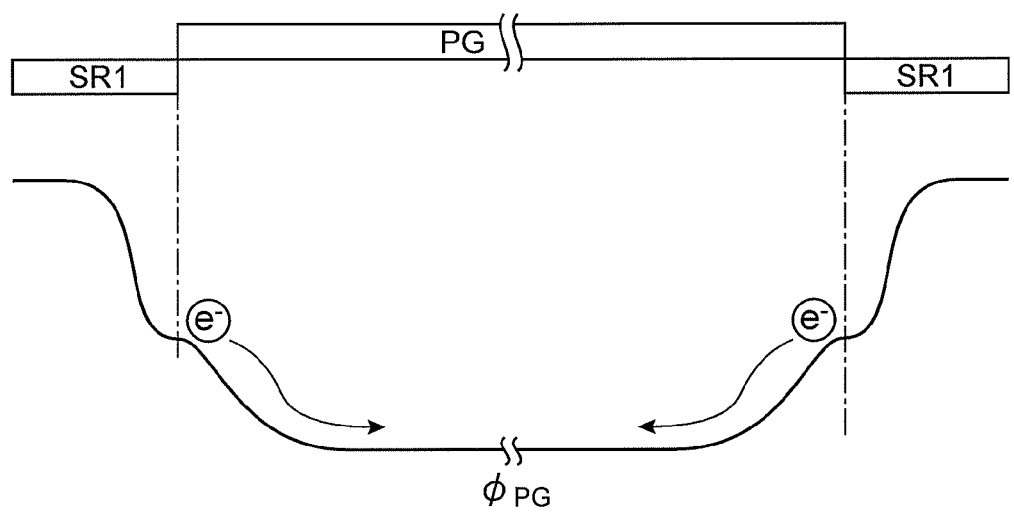
FIG. 18 is a drawing showing potential profiles, for explaining an accumulation operation of signal charge.

The fourth semiconductor regions SR1 are regions having the same conductivity type as the semiconductor substrate 1A and a higher impurity concentration than the semiconductor substrate 1Ab, i.e., regions comprised of a p-type semiconductor with a high impurity concentration. The fourth semiconductor regions SR1 may be p-type well regions or p-type diffusion regions. The thickness/impurity concentration of the fourth semiconductor regions SR1 are as follows. Fourth semiconductor regions SR1: thickness 1-5 μm/impurity concentration $1\times10^{16}$-$10^{18}$ cm$^{-3}$ Since the fourth semiconductor regions SR1 are arranged in the present modification example, the potential $\Phi_{PG}$ of the region immediately below the photogate electrode PG is higher on the sides where the first and second short sides SS1, SS2 exist, as shown in FIG. 18. Accordingly, a potential gradient decreasing from the sides of the first and second short sides SS1, SS2 to the regions between the first and second semiconductor regions FD1, FD2 is formed in the region immediately below the photogate electrode PG. FIG. 18 is a drawing showing a potential profile near the light incident surface 1FT of the semiconductor substrate 1A, for explaining the accumulation operation of signal charge. In FIG. 18, the downward direction corresponds to the positive direction of potential. FIG. 18 shows the potential profile along the line XVII-XVII in FIG. 16.

The charge generated near the first and second short sides SS1, SS2 in the region immediately below the photogate electrode PG is accelerated according to the potential gradient formed by the fourth semiconductor regions SR1, to quickly migrate toward the regions located between the first and second semiconductor regions FD1, FD2. Then the migrating charge is accumulated in the potential wells of the first semiconductor regions FD1 or in the potential wells of the second semiconductor regions FD2 in accordance with the potential gradient formed by the electric field of the first gate electrodes TX1 and the first semiconductor regions FD1 or in accordance with the potential gradient formed by the electric field of the second gate electrodes TX2 and the second semiconductor regions FD2, as described above.

In the present modification example, the fourth semiconductor regions SR1 form the potential gradient such that the potential on the sides of the first and second short sides SS1, SS2 in the region (light receiving region and charge generating region) immediately below the photogate electrode PG is higher than the potential in the regions located between the first and second semiconductor regions FD1, FD2 and the potential decreases toward the regions located between the first and second semiconductor regions FD1, FD2. For this reason, the charge generated near the first and second short sides SS1, SS2 in the region immediately below the photogate electrode PG becomes easier to migrate in the direction in which the first and second short sides SS1, SS2 are opposed, toward the regions located between the first and second semiconductor regions FD1, FD2, because of the foregoing potential gradient. The charge having migrated in the direction in which the first and second short sides SS1, SS2 are opposed, from the sides of the first and second short sides SS1, SS2 toward the regions located between the first and second semiconductor regions FD1, FD2 is quickly transferred by the electric field established by the first gate electrodes TX1 and the first semiconductor regions FD1 or by the electric field established by the second gate electrodes TX2 and the second semiconductor regions FD2. In the present modification example, therefore, the charge generated in the charge generating region can be transferred more quickly.

In the present modification example the fourth semiconductor regions SR1 are formed by adjusting the impurity concentration of the semiconductor substrate 1A. For this reason, it is feasible to readily realize the configuration for making the potential on the sides of the first and second short sides SS1, SS2 in the region immediately below the photogate electrode PG higher than the potential in the regions located between the first and second semiconductor regions FD1, FD2.

Figure 19:
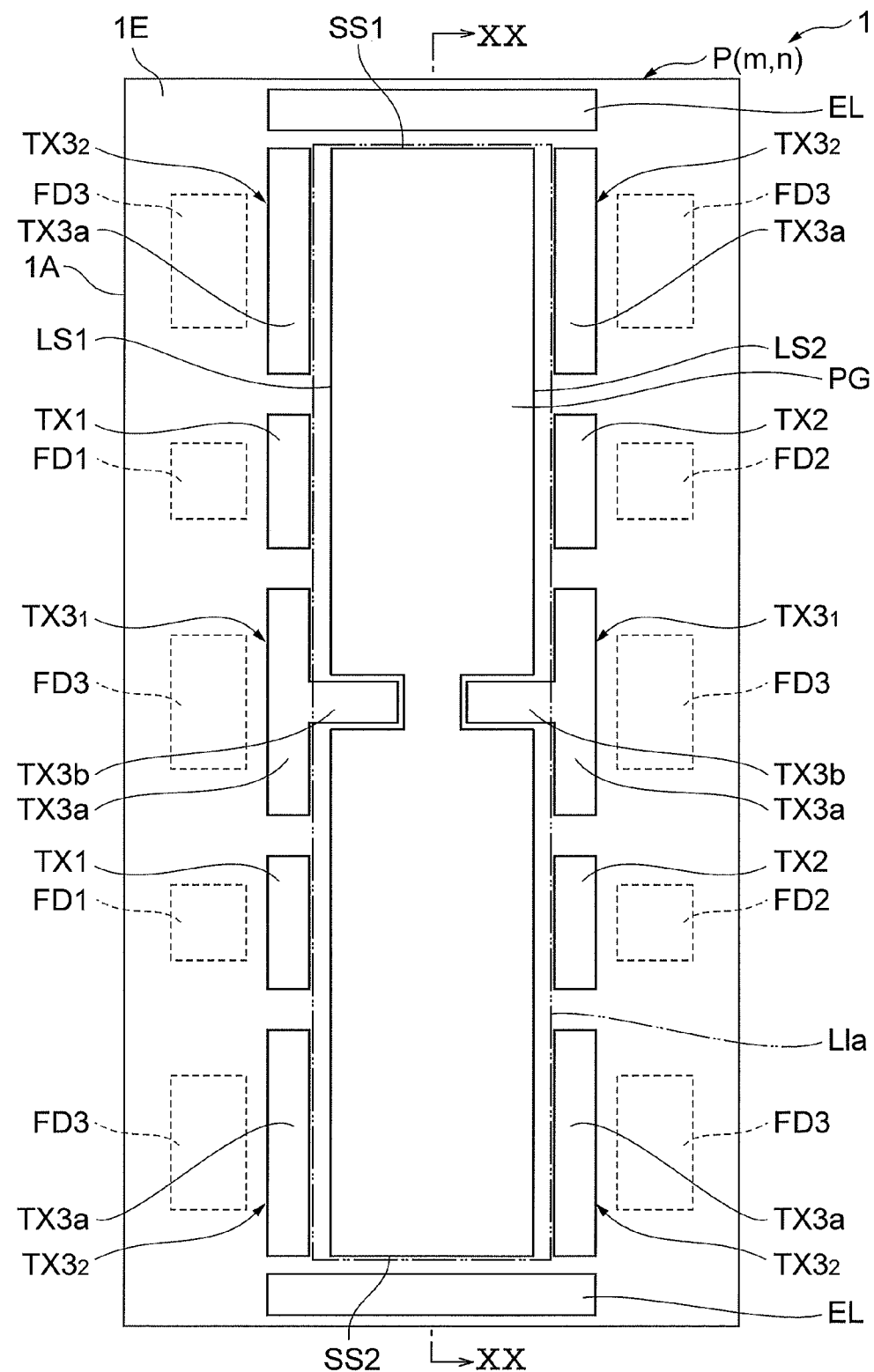
FIG. 19 is a schematic drawing for explaining a configuration of a pixel in a modification example of the range image sensor.
Figure 20:
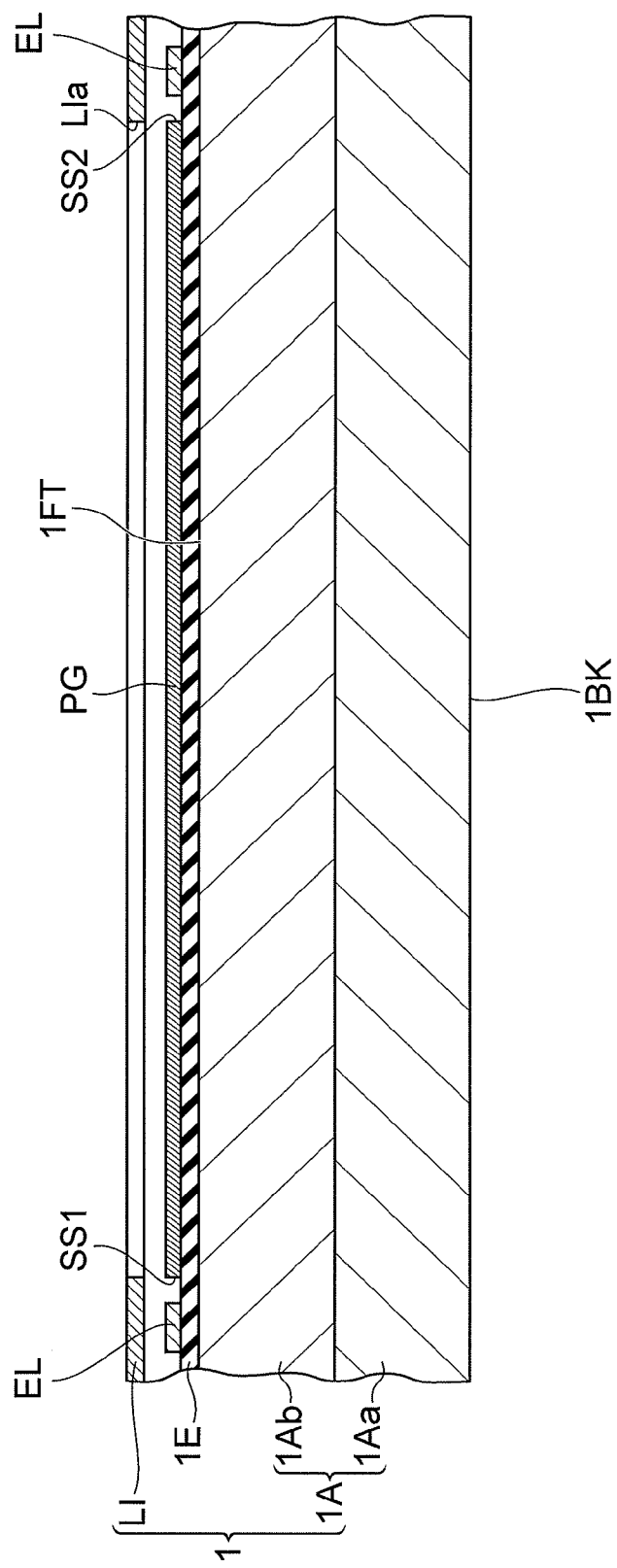
FIG. 20 is a drawing showing a cross-sectional configuration along the line XX-XX in FIG. 21.

Next, another modification example of the range image sensor 1 will be described with reference to FIGS. 19 and 20. FIG. 19 is a schematic drawing for explaining a configuration of a pixel in the modification example of the range image sensor. FIG. 20 is a drawing showing a cross-sectional configuration along the line XX-XX in FIG. 19. The present modification example is different from the modification example shown in FIG. 16, in that the sensor is provided with potential adjusting electrodes EL, instead of the third semiconductor regions SR1. In FIG. 19, the illustration of conductors 11 is also omitted.

The potential adjusting electrodes EL are arranged along the first and second short sides SS1, SS2, respectively, on the sides where the first and second short sides SS1, SS2 of the photogate electrode PG exist. Namely, the potential adjusting electrodes EL are arranged opposite to each other with the photogate electrode PG (light receiving region and charge generating region) in between in the direction in which the first and second short sides SS1, SS2 are opposed.

The potential adjusting electrodes EL are rectangular on the plan view. In the present embodiment, the potential adjusting electrodes EL have a rectangular shape the long-side direction of which is the direction in which the first and second long sides LS1, LS2 are opposed. The length of the potential adjusting electrodes EL in the direction in which the first and second long sides LS1, LS2 are opposed, is set, for example, approximately equal to the length of the first and second short sides SS1, SS2 of the photogate electrode PG. The potential adjusting electrodes EL are comprised of polysilicon, but these may be comprised of another material.

Figure 21:
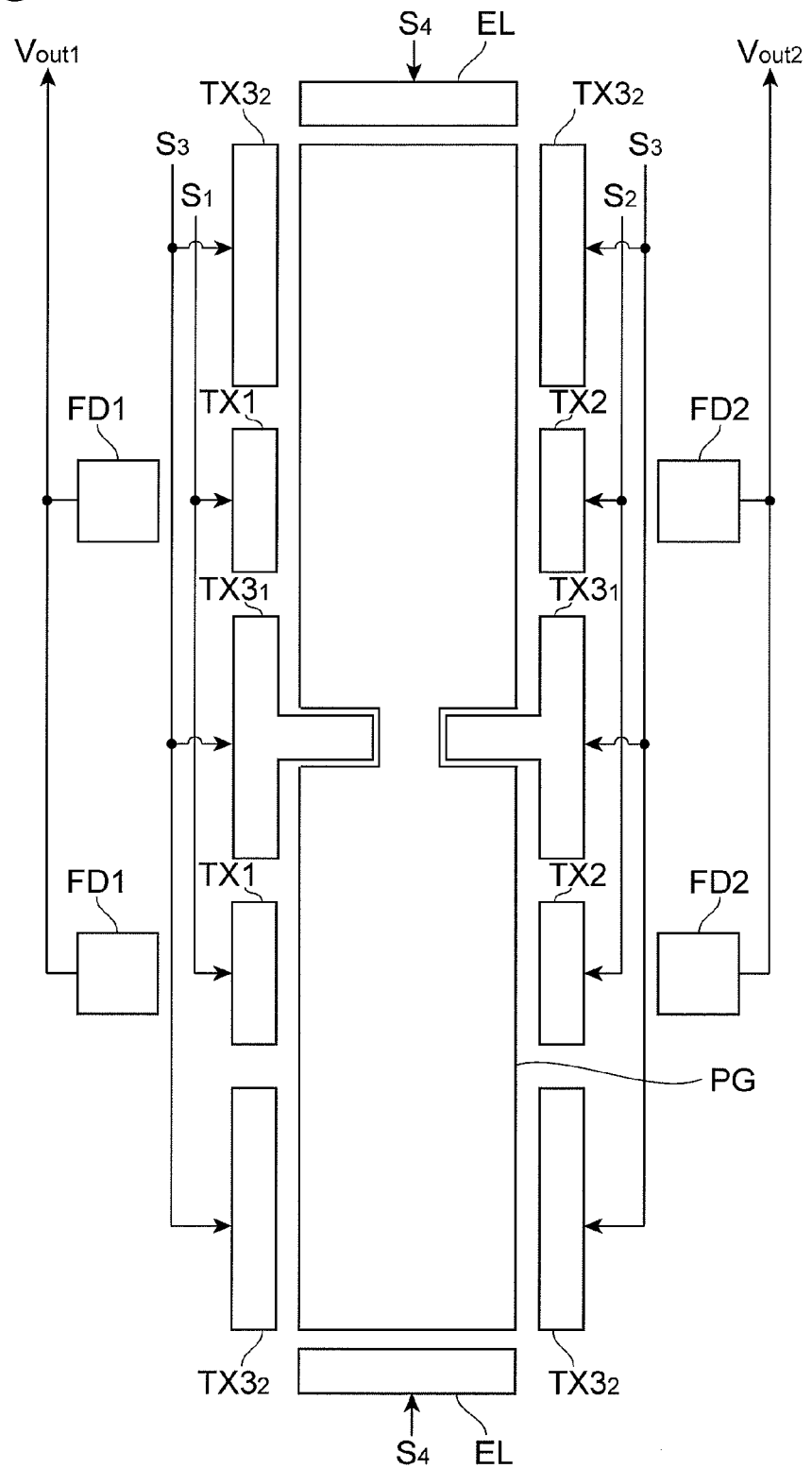
FIG. 21 is a schematic drawing for explaining a configuration of a pixel.
Figure 22:
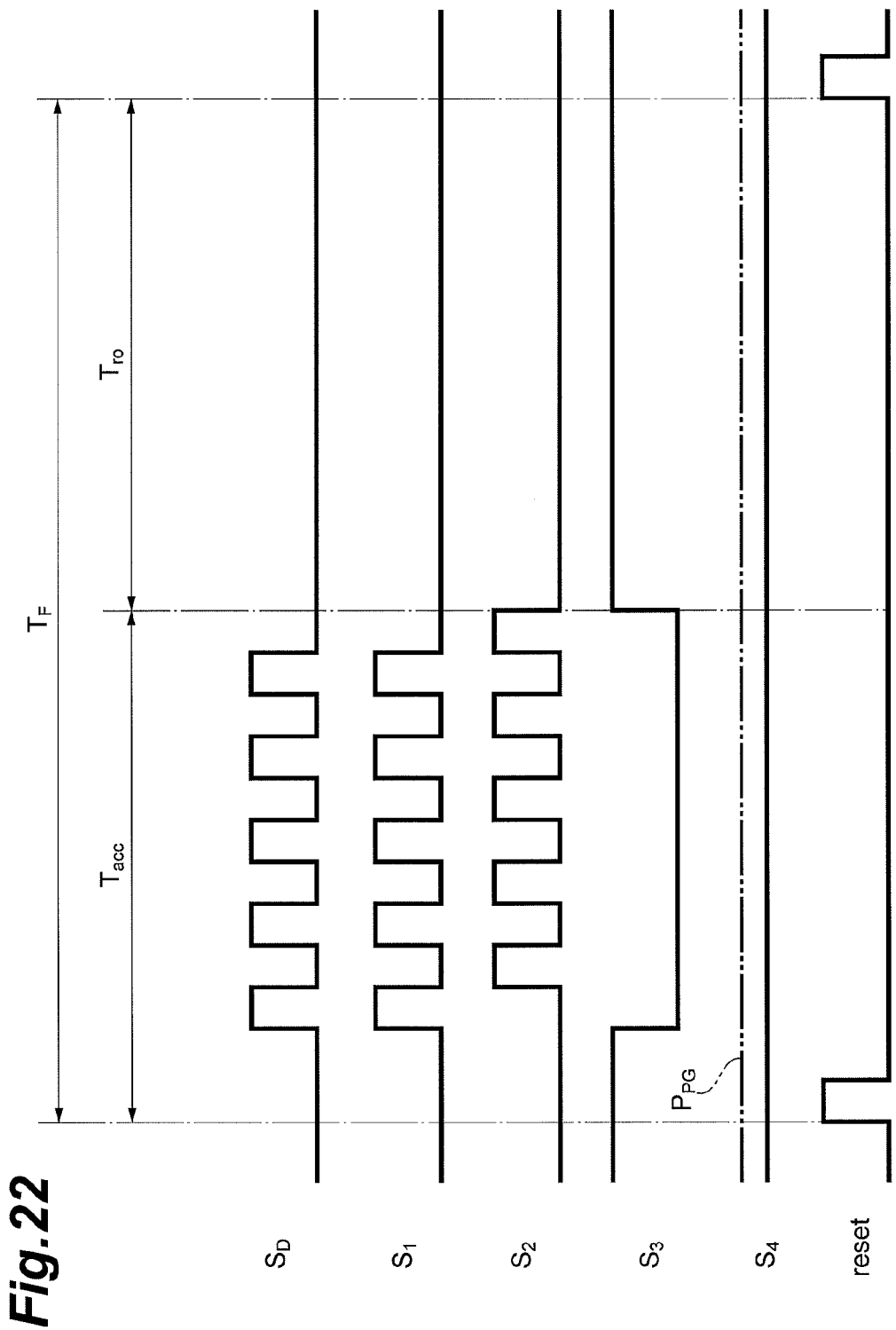
FIG. 22 is a timing chart of various signals.

The potential adjusting electrodes EL are given an electrical potential lower than the electrical potential ($P_{PG}$) given to the photogate electrode PG, by a potential adjustment signal $S_4$, as shown in FIGS. 21 and 22. FIG. 21 is a schematic drawing for explaining a configuration of a pixel. FIG. 22 is a timing chart of actual various signals, in which the signals other than the potential adjustment signal $S_4$ are the same as the signals shown in FIG. 12. The potential adjustment signal $S_4$ is supplied from the controlling circuit 2.

Figure 23:
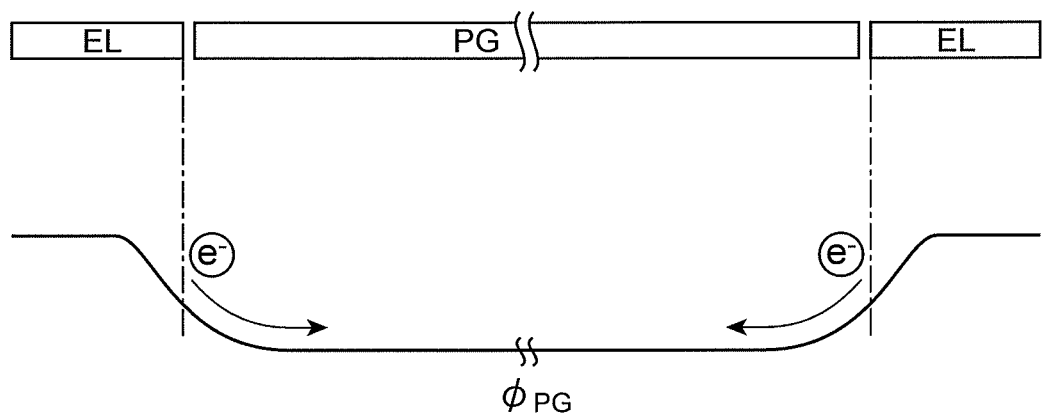
FIG. 23 is a drawing showing potential profiles, for explaining an accumulation operation of signal charge.

Since in the present modification example the potential adjusting electrodes EL are given the electrical potential lower than the electrical potential given to the photogate electrode PG, the potential $\Phi_{PG}$ of the region immediately below the photogate electrode PG is higher on the sides where the first and second short sides SS1, SS2 exist, as shown in FIG. 23. Therefore, a potential gradient decreasing from the sides of the first and second short sides SS1, SS2 toward the regions located between the first and second semiconductor regions FD1, FD2 is formed in the region immediately below the photogate electrode PG. FIG. 23 is a drawing showing a potential profile near the light incident surface 1FT of the semiconductor substrate 1A, for explaining the accumulation operation of signal charge. In FIG. 23 the downward direction corresponds to the positive direction of potential. FIG. 23 shows the potential profile along the line XX-XX in FIG. 19.

The charge generated near the first and second short sides SS1, SS2 in the region immediately below the photogate electrode PG is accelerated according to the potential gradient formed by the potential adjusting electrodes EL, to quickly migrate toward the regions located between the first and second semiconductor regions FD1, FD2. Then the migrating charge is accumulated in the potential wells of the first semiconductor regions FD1 or in the potential wells of the second semiconductor regions FD2 in accordance with the potential gradient formed by the electric field of the first gate electrodes TX1 and the first semiconductor regions FD1 or in accordance with the potential gradient formed by the electric field of the second gate electrodes TX2 and the second semiconductor regions FD2.

In the present modification example, as in the case of the modification example shown in FIG. 16, the charge generated in the charge generating region can be transferred more quickly.

In the present modification example, the potential adjusting electrodes EL make the potential on the sides of the first and second short sides SS1, SS2 in the region immediately below the photogate electrode PG higher than the potential in the regions located between the first and second semiconductor regions FD1, FD2. For this reason, the present modification example can readily realize the configuration for making the potential on the sides of the first and second short sides SS1, SS2 in the region immediately below the photogate electrode PG higher than the potential in the regions located between the first and second semiconductor regions FD1, FD2.

The above described the preferred embodiments of the present invention, but it should be noted that the present invention is by no means limited to the above embodiments but can be modified in various ways without departing from the scope and spirit thereof.

The charge generating region where charge is generated according to incident light may be composed of a photodiode (e.g., a buried photodiode or the like). The range image sensor 1 may be a back illuminated type range image sensors. The range image sensor 1 does not have to be limited to those wherein pixels P(m, n) are arrayed in a two-dimensional pattern, but may be one wherein pixels P(m, n) are arrayed in a one-dimensional pattern.

The numbers of the first and second semiconductor regions FD1, FD2 are not limited each to 2, but may be three or more.

The lengths of the fourth semiconductor regions SR1 and the potential adjusting electrodes EL in the direction in which the first and second long sides LS1, LS2 are opposed, are not limited to the above-described values. The lengths may be set, for example, smaller than the length of the short sides as long as they can make the potential on each short-side side in the light receiving region (charge generating region) higher than the potential in the regions located between the first and second semiconductor regions FD1, FD2.

The shape of the second electrode portions TX3$b$ of the third gate electrodes TX3$_1$ is not limited to the aforementioned rectangular shape. For example, the shape of the second electrode portions TX3$b$ of the third gate electrodes TX3$_1$ may be a semicircular shape, a triangular shape, a trapezoid shape, or the like, or may be a shape in which the width in the direction in which the first and second short sides SS1, SS2 are opposed, varies stepwise.

The semiconductor regions FD1 or FD2 are arranged in juxtaposition in the direction in which the first and second short sides SS1, SS2 are opposed, on the same side where the long side LS1 or LS2 exists, but they are not limited to this configuration. The first semiconductor regions FD1 and the second semiconductor regions FD2 may be arranged in juxtaposition in the direction in which the first and second short sides SS1, SS2 are opposed, on the same side of the long side LS1, LS2. In this case, the first gate electrodes TX1 and the second gate electrodes TX2 are juxtaposed corresponding to the arrangement of the first and second semiconductor regions FD1, FD2 in the direction in which the first and second short sides SS1, SS2 are opposed, on the same side of the long side LS1, LS2.

INDUSTRIAL APPLICABILITY

The present invention is applicable to the range sensors and the range image sensors mounted on product monitors in manufacture lines in factories, on vehicles, and so on.

LIST OF REFERENCE SIGNS

1 range image sensor; 1A semiconductor substrate; EL potential adjusting electrodes; FD1 first semiconductor regions; FD2 second semiconductor regions; FD3 third semiconductor regions; LS1 first long side; LS2 second long side; P pixel; PG photogate electrode; SR1 fourth semiconductor regions; SS1 first short side; SS2 second short side; TX1 first gate electrodes; TX2 second gate electrodes; TX3$_1$, TX3$_2$ third gate electrodes; TX3$a$ first electrode portion; TX3$b$ second electrode portion.

The invention claimed is:

1. A range sensor comprising:
   a light receiving region a planar shape of which is a rectangular shape having a pair of long sides opposed to each other in a first direction and a pair of short sides opposed to each other in a second direction;
   a plurality of signal charge collecting regions arranged as opposed to each other with the light receiving region in between in the first direction and as spatially separated from each other in the second direction, for collecting signal charge generated according to incident light;

transfer electrodes each of which is arranged between the signal charge collecting region and the light receiving region and to which respective charge transfer signals of different phases are supplied;

unnecessary charge collecting regions for collecting unnecessary charge generated; and unnecessary charge collecting gate electrodes arranged beside each of the long sides, as spatially separated from each other between the transfer electrodes arranged along the long side, for selectively performing blocking and opening of a flow of unnecessary charge into the unnecessary charge collecting regions, wherein each of the unnecessary charge collecting gate electrodes has a first electrode portion located between the unnecessary charge collecting region and the light receiving region, and a second electrode portion overlapping with the light receiving region and having a width in the second direction smaller than that of the first electrode portion.

2. The range sensor according to claim 1,
wherein the second electrode portion has the width in the second direction decreasing with distance from the first electrode portion.

3. The range sensor according to claim 1,
wherein the second electrode portions opposed to each other in the first direction are continuous with each other.

4. The range sensor according to claim 1, further comprising:
potential adjusting means arranged opposite to each other with the light receiving region in between in the second direction, for making a potential near each of the short sides of the light receiving region, higher than a potential in regions located between the signal charge collecting regions opposed to each other in the first direction, in the light receiving region.

5. The range sensor according to claim 4,
wherein the potential adjusting means are semiconductor regions having the same conductivity type as the light receiving region and a higher impurity concentration than the light receiving region.

6. The range sensor according to claim 4, further comprising:
a photogate electrode located above the light receiving region,
wherein the potential adjusting means are electrodes given an electrical potential lower than an electrical potential given to the photogate electrode.

7. The range sensor according to claim 1,
wherein the unnecessary charge collecting gate electrodes are given an electrical potential such that a potential in regions immediately below the second electrode portions is higher than a potential in regions located between the signal charge collecting regions opposed to each other in the first direction, during the blocking of the flow of unnecessary charge into the unnecessary charge collecting regions.

8. A range image sensor comprising an imaging region consisting of a plurality of units arranged in a one-dimensional pattern or in a two-dimensional pattern, on a semiconductor substrate, and configured to obtain a range image, based on charge quantities output from the units,
wherein one said unit is the range sensor defined in claim 1.

* * * * *